(12) United States Patent
Zentner et al.

(10) Patent No.: US 9,148,771 B2
(45) Date of Patent: Sep. 29, 2015

(54) METHOD TO PROVIDE CONTEXT-AWARE LINKAGE BETWEEN NG9-1-1 SMS AND PUBLIC SAFETY INCIDENT

(71) Applicant: MOTOROLA SOLUTIONS, INC, Schaumburg, IL (US)

(72) Inventors: Mark H Zentner, Longmont, CO (US); Brian J Frommelt, Deer Park, IL (US); George J Horwath, Norridge, IL (US); Paul F Mafera, Winchester, MA (US); Daniel J Sawicki, Carol Stream, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 193 days.

(21) Appl. No.: 13/953,051

(22) Filed: Jul. 29, 2013

(65) Prior Publication Data

US 2015/0031324 A1    Jan. 29, 2015

(51) Int. Cl.
*H04W 4/22* (2009.01)
*H04M 3/51* (2006.01)

(52) U.S. Cl.
CPC .............. *H04W 4/22* (2013.01); *H04M 3/5116* (2013.01)

(58) Field of Classification Search
CPC ...................... H04M 2201/38; H04M 2201/42; H04M 3/5116; H04W 4/22
USPC .............................. 455/404.1, 404.2; 379/45
See application file for complete search history.

(56) References Cited

U.S. PATENT DOCUMENTS

| | | | |
|---|---|---|---|
| 5,530,865 A | 6/1996 | Owens et al. | |
| 6,240,430 B1 | 5/2001 | Deike et al. | |
| 6,272,505 B1 | 8/2001 | De Lahuerga | |
| 6,331,840 B1 | 12/2001 | Nielson et al. | |
| 6,345,284 B1 | 2/2002 | Dinkelacker | |
| 6,356,287 B1 | 3/2002 | Ruberry et al. | |
| 6,532,474 B2 | 3/2003 | Iwamoto et al. | |
| 6,944,821 B1 | 9/2005 | Bates et al. | |
| 7,216,290 B2 | 5/2007 | Goldstein et al. | |
| 7,278,092 B2 | 10/2007 | Krzanowski | |
| 7,360,166 B1 | 4/2008 | Krzanowski | |
| 7,373,603 B1 | 5/2008 | Yalovsky et al. | |
| 7,562,287 B1 | 7/2009 | Goldstein et al. | |
| 7,624,353 B2 | 11/2009 | Beumer | |
| 7,707,518 B2 | 4/2010 | Veselova | |
| 7,711,723 B2 | 5/2010 | Dettinger et al. | |
| 7,712,049 B2 | 5/2010 | Williams et al. | |
| 7,735,017 B2 | 6/2010 | Cunningham et al. | |
| 7,747,557 B2 | 6/2010 | Sareen et al. | |
| 7,774,753 B1 | 8/2010 | Reilly et al. | |
| 7,788,589 B2 | 8/2010 | Frankel et al. | |

(Continued)

*Primary Examiner* — Nam Huynh

(74) *Attorney, Agent, or Firm* — Kenneth A. Haas

(57) ABSTRACT

A method and computer program for providing a computer aided dispatcher comprising receiving, by a public safety answering point, a plurality of emergency short message service (SMS) messages from one or more citizens over a wireless communication network, each emergency SMS message including a mobile terminal identifier, displaying each emergency SMS message in one or more display dialogue windows, receiving a command to highlight a portion of at least one of the emergency SMS message, storing the highlighted portion into one or more buffers, the highlighted portion being all or less than all of the emergency SMS message and receiving a command to associate the highlighted portion to one of a plurality of context fields in an emergency incident information report, the associated highlighted portion, selected context field and mobile terminal identifier stored in memory.

20 Claims, 14 Drawing Sheets

(56) References Cited

U.S. PATENT DOCUMENTS

| | | |
|---|---|---|
| 7,793,224 B1 | 9/2010 | Ayers |
| 7,793,233 B1 | 9/2010 | Sellers et al. |
| 7,797,638 B2 | 9/2010 | Dev Sareen et al. |
| 7,802,262 B1 | 9/2010 | Lynch et al. |
| 7,921,128 B2 | 4/2011 | Hamilton, II et al. |
| 7,934,210 B1 | 4/2011 | Stampfli et al. |
| 8,001,458 B1 | 8/2011 | Lynch |
| 8,019,797 B2 | 9/2011 | Hamilton, II et al. |
| 8,020,101 B2 | 9/2011 | Kesavarapu |
| 8,234,657 B1 | 7/2012 | Lynch et al. |
| 8,261,197 B2 | 9/2012 | Lemay et al. |
| 2002/0129068 A1 | 9/2002 | Takasu et al. |
| 2003/0028609 A1 | 2/2003 | Cahill |
| 2004/0181749 A1 | 9/2004 | Chellapilla et al. |
| 2008/0313529 A1 | 12/2008 | Gwozdz et al. |
| 2010/0003958 A1* | 1/2010 | Ray et al. .................. 455/404.2 |
| 2012/0136756 A1 | 5/2012 | Jitkoff et al. |
| 2012/0256745 A1* | 10/2012 | Piett et al. ..................... 340/540 |

* cited by examiner

FIG. 6

| Status Message Window | | | 700 |
|---|---|---|---|
| SMS #1 | My house is on fire | 00:56 | 708-555-5551 710 |
| SMS #2 | just got into car accident | 01:01 | 708-555-5552 720 |
| SMS #3 | Can you send an ambulance | 00:43 | 708-555-5553 730 |
| SMS #4 | someone is being robbed at gunpoint | 01:45 | 708-555-5554 740 |

*FIG. 7*

US 9,148,771 B2

METHOD TO PROVIDE CONTEXT-AWARE LINKAGE BETWEEN NG9-1-1 SMS AND PUBLIC SAFETY INCIDENT

FIELD OF INVENTION

The present invention relates to public safety answering points employed in next generation 9-1-1 emergency services networks. In particular, example embodiments of the invention relate to providing context-aware linkage between NG9-1-1 SMS and a public safety incident.

BACKGROUND OF THE INVENTION

The National Emergency Number Association (NENA) defined a technical specification, commonly referred to as i3 which provides for the evolution of the North American 9-1-1 system called "Next Generation 9-1-1" (NG9-1-1). The NG9-1-1 system is an all-IP-based emergency communications system which will include new functionality such as employing short message service (SMS) text message as a method of public safety incident origination. More recently, the Joint Alliance for Telecommunications Industry Solutions (ATIS) and the Telecommunications Industry Association (TIA) released a standard for employing short message services (SMS) in a NG9-1-1. See. "Native SMS TO 9-1-1 Requirements and Architecture Specification" approved March 2013 (hereinafter "J-STD-110").

SMS has been criticized and labeled an inferior technology for public safety incident origination, primarily due to its fundamental inability to support identification of callers' location information. Other limitations of SMS are the inability to transfer, conference or park an SMS message.

Accordingly, there is a need for a method and computer implemented operation which would provide context-aware linkage between NG9-1-1 SMS and a public safety incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in, and form part of, the specification and serve to further illustrate embodiments of concepts that include the claimed invention, and explain various principles and advantages of those embodiments.

FIG. 6 is an illustration of an example of a public safety incident report dialogue window in accordance with example embodiment;

FIG. 7 is an illustration of a status text window suitable for displaying summary data of one or more SMS text messages in accordance with example embodiment;

Figure 1:
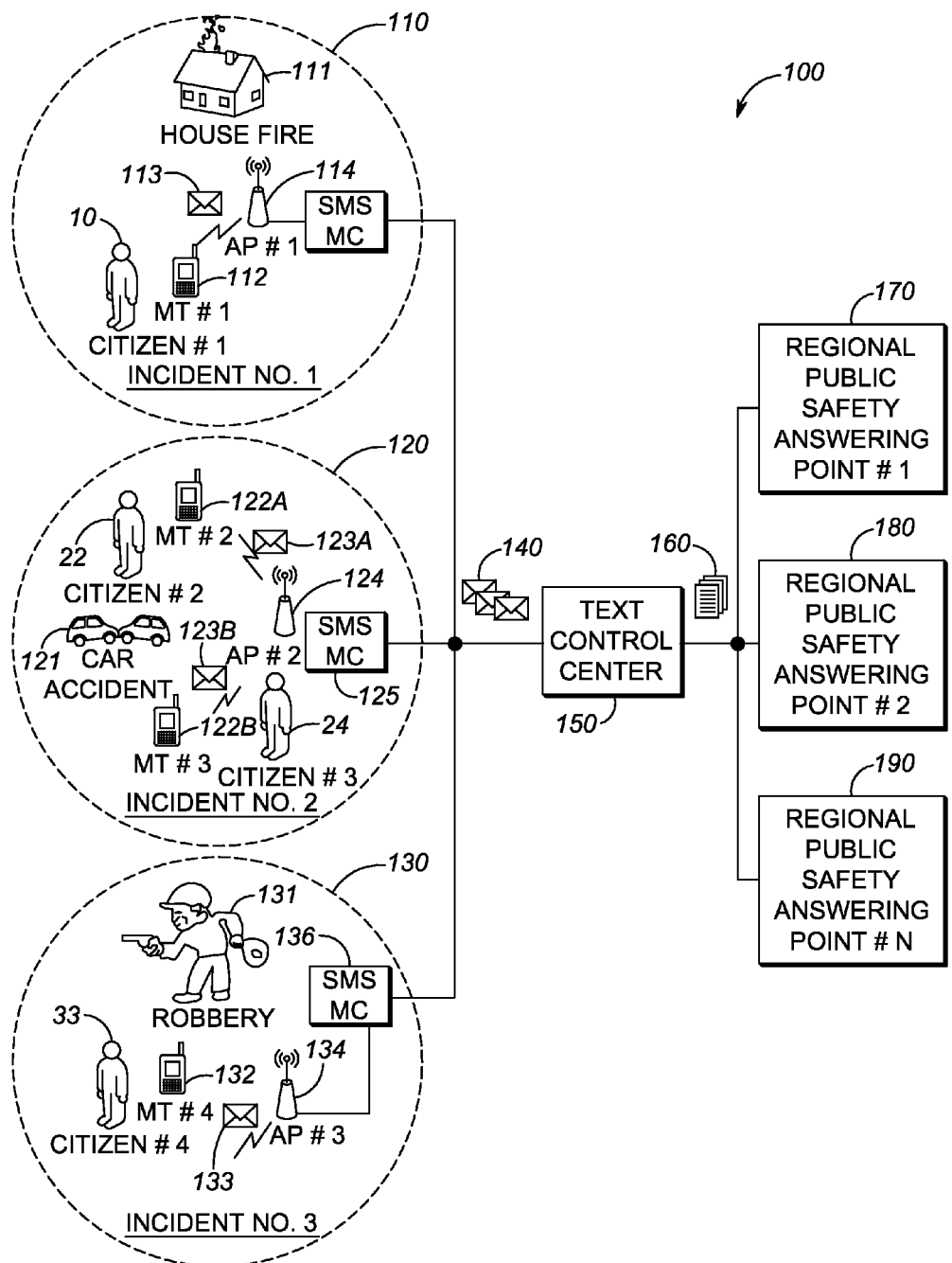
FIG. 1 is an illustration of a native short message service to 9-1-1 emergency services system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments described herein.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

The present invention provides methods and computer programs for providing a computer aided dispatcher comprising receiving, by a public safety answering point, a plurality of emergency short message service (SMS) messages from one or more citizens over a wireless communication network, each emergency SMS message including a mobile terminal identifier, displaying each emergency SMS message in one or more display dialogue windows, receiving a command to highlight a portion of at least one of the emergency SMS message, storing the highlighted portion into one or more buffers said highlighted portion being all or less than all of the emergency SMS message, and receiving a command to associate the highlighted portion to one of a plurality of context fields in an emergency incident information report, with the associated highlighted portion, selected context field and mobile terminal identifier stored in memory.

FIG. 1 depicts a short message service (SMS) to 9-1-1 emergency service system 100 suitable for carrying out example embodiments. As shown in FIG. 1, the system is adapted to accept a plurality of native SMS text messages from several cellular wireless devices, such as mobile terminal (MT) MT 112, MT 122A, MT 122B and MT 132. That is, each mobile terminal is equipped with Native SMS firmware or applications which provide text message service by way of each citizen's associated cellular subscription purchased from their wireless operators as part of a messaging plan, or a voice plan that includes messaging. Native SMS is operated and managed by the wireless operators. Each native SMS message can for example be limited to 160 characters. However, in another example embodiment, native SMS message sent from a mobile terminal supporting concatenated messages can exceed 160 characters.

Mobile terminals, MT 112, MT 122A, MT 122B and MT 132 can be equipped with a third-party over-the-top SMS (OTT) SMS application (or embedded in other applications or games). That is, a text messaging application provided on mobile terminals by companies other than the wireless operators that provide connectivity for the citizen-subscribers. The mobile terminals, MT 112, MT 122A, MT 122B and MT 132 can be a cellular phone, smart phone, tablet, laptop computer or telematics device A mobile terminal, such as MT 112, MT 122A, MT 122B and MT 132 can be connected to an access point (AP), such as AP #1 (114), AP #2 (124), or AP #3 (134). Various radio access networks can be utilized to support originating native SMS to the SMS to 9-1-1 emergency service system. For example, a code division multiple access 2000 (CDMA2000) radio access network, a global system for mobile communications (GSM) radio access network, enhanced data rates for GSM evolution (EDGE) radio access network, a universal terrestrial radio access network (UMTS), or a radio access network such as a long term evolution (LTE), LTE-Advance (LTE-A) or LTE-Beyond (LTE-B) radio access network (e.g., each LTE technology adapted to include support for circuit switch callback (CSFB) and native SMS). Accordingly, some non-limiting examples of AP #1 (114), AP #2 (124), or AP #3 (134) are a base station, a base transceiver station (coupled to a radio network controller), a Node base station (NB), evolved eNB), macro eNB, femto eNB, pico eNB, a relay or remote radio head.

Each mobile terminal is configured to accept user commands from citizen-users (citizens), such as citizen #1 (10) citizen #2 (22), citizen #3 (24), and citizen #4 (33). Each citizen can employ a native SMS application to report an emergency incident to an emergency service network by entering a three-digit code such as "9-1-1." For example, citizen #1 (10) has the option of sending a native SMS message 113 to report a first emergency incident 110 which is a house fire 111. Citizen #2 (22) and Citizen #3 (24) also both have the option of sending a native SMS message by entering the code 9-1-1 in their mobile terminals (i.e., native SMS message 123A and native SMS message 123B). That is, instead of placing a phone call to 9-1-1 to report a second emergency incident 120 which is an automobile accident 121. Similarly, citizen #4 (33) has the option of sending a native SMS message 133 to report a third emergency incident 130 which is a robbery 131.

Also shown in FIG. 1 is a text control center (TCC) 150 which is a controlling functional element in the SMS-to-9-1-1 service network. That is, the TCC 150 acts as a gateway by converting a plurality of native SMS messages 140 originating from one or more mobile terminal (e.g., MT 112, MT 122A, MT 122B, MT 132) to a plurality of text messages 160 suitable for handling by one or more regional PSAPs (e.g., PSAP 170, PSAP 180, PSAP 190). That is, TCC 150 converts the SMS messages into a format that each PSAPs can understand (e.g., converts various protocols for exchanging native SMS messages between the mobile terminals and PSAPs). The TCC 150 (acting as a gateway) also converts a text message reply from a PSAP back to the originating mobile terminal.

The TCC 150 also converts protocols for messages exchanged between various related functional elements which support the exchange of messages among the mobile terminals and PSAPs. As will be explained in more detail below with reference to FIG. 2 and FIG. 3, the TCC 150 may request location information from one or more functional entities that may be employed for routing native SMS messages to one or more PSAPs in a specific emergency call region. It is important to note that location information is "course location" which is typically the initial location estimate of the mobile terminal that is used only for routing of the native SMS message. Moreover, a course location is merely considered as a "good enough" location used to determine routing to the appropriate PSAP (or other Public Safety entity), such as PSAP 170, PSAP 180 or PSAP 190. This should be distinguished from a precise (position) location needed for dispatching emergency services to a citizen sending a native SMS message. Course location can consists of the Latitude/Longitude (X/Y) coordinates representing the geographic center (centroid) of the cell site/cell site sector actor area currently associated with the mobile device where an emergency text message dialogue is initiated.

The TCC 150 also may request routing instructions from one or more routing functional entities. Furthermore, the TCC 140 will initiate a dialogue with one or more regional PSAPs, such as PSAP 170, PSAP 180 and PSAP 190 through one or more interworking functions (IWFs) as will be explained in more detail below with reference to FIG. 2. Moreover, each regional PSAP employs customer premise equipment (CPE) terminal equipment at each regional PSAP as explained below in connection with FIG. 3.

Each regional PSAP (e.g., PSAP 170, PSAP 180 and PSAP 190) operates under common management which receives 9-1-1 calls as well as text messages (e.g., a plurality of text messages 160) in accordance with specifically defined geographical areas and processes those calls and text messages according to a predetermined operational policy. That is, PSAP is a facility equipped and staffed to receive 9-1-1 calls. Regional PSAP (in accordance with a predetermined operational policy) can be designated as a primary PSAP to receive calls/messages directly if the call/message is relayed or transferred to/from the next receiving regional PSAP which is designated as a Secondary PSAP. For example, in a predetermined region, PSAP 170 could be designated as the primary PSAP, with PSAP 180 serving as a secondary PSAP, while one or more PSAPs, such as PSAP 190, serves as the backup regional PSAP.

TCC 150 may be further configured to determine in a dialogue with regional PSAPs whether text message coverage is available and whether a bounce-back message should be issued to a mobile terminal. For example, a bounce-back message can be send in the event that a PSAP coverage region is not capable of receiving end-users SMS messages from within MT 112, MT 122A, MT 122B, or MT 132 (and no alternatives PSAPs are available). The content of the bounce-back message can, for example, inform the user that text to 9-1-1 service is not available and that the user should make a voice call to 911 for help. Alternatively, the TCC 150 may also issue a bounce-back message if an error occurs in communicating with a P SAP. Some examples of errors are where no course location information (cell site location) for the mobile device can be obtained or determined Another error could be where no PSAP configuration information is available for the subscriber's current location, or the PSAP configuration information for the subscriber's current location is incomplete, invalid, or cannot be retrieved. Yet another ground for issuing a bounce-back message could be where an error occurred while trying to route the text message signaling to the associated PSAP.

In one example embodiment, the short message service (SMS) to 9-1-1 emergency service system 100, shown in FIG. 1, could adhere to some or all of the requirements and architectural specifications set forth by the Joint Alliance for Telecommunications Industry Solutions (ATIS) and the Telecommunications Industry Association (TIA) in their standard "Native SMS TO 9-1-1 Requirements and Architecture Specification," approved March 2013 (hereinafter "J-STD-110"). The J-STD-110 standard defines the requirements, architecture and procedures for text messaging to 9-1-1 emergency services using native wireless operator SMS capabilities for existing generations and next generation (NG9-1-1) PSAPs.

According to J-STD-110, a variety of approaches for delivery of SMS to 9-1-1 messages to PSAP is supported. The three main types of delivery mechanisms are: (a) delivery to a legacy emergency services network using teletypewriter (TTY) inter-working (IWF) function; (b) delivery to a transitional PSAP by way of a web service application; and (c) delivery to a national emergency number association (NENA) i3 emergency services IP network (ESInet) which ultimately supports two more types of delivery, (to both legacy and NG9-1-1 i3 PSAPs). Example embodiments provide methods and computer programs related to legacy PSAPs and transitional PSAPs where no location information is provided to either PSAP.

Figure 2:
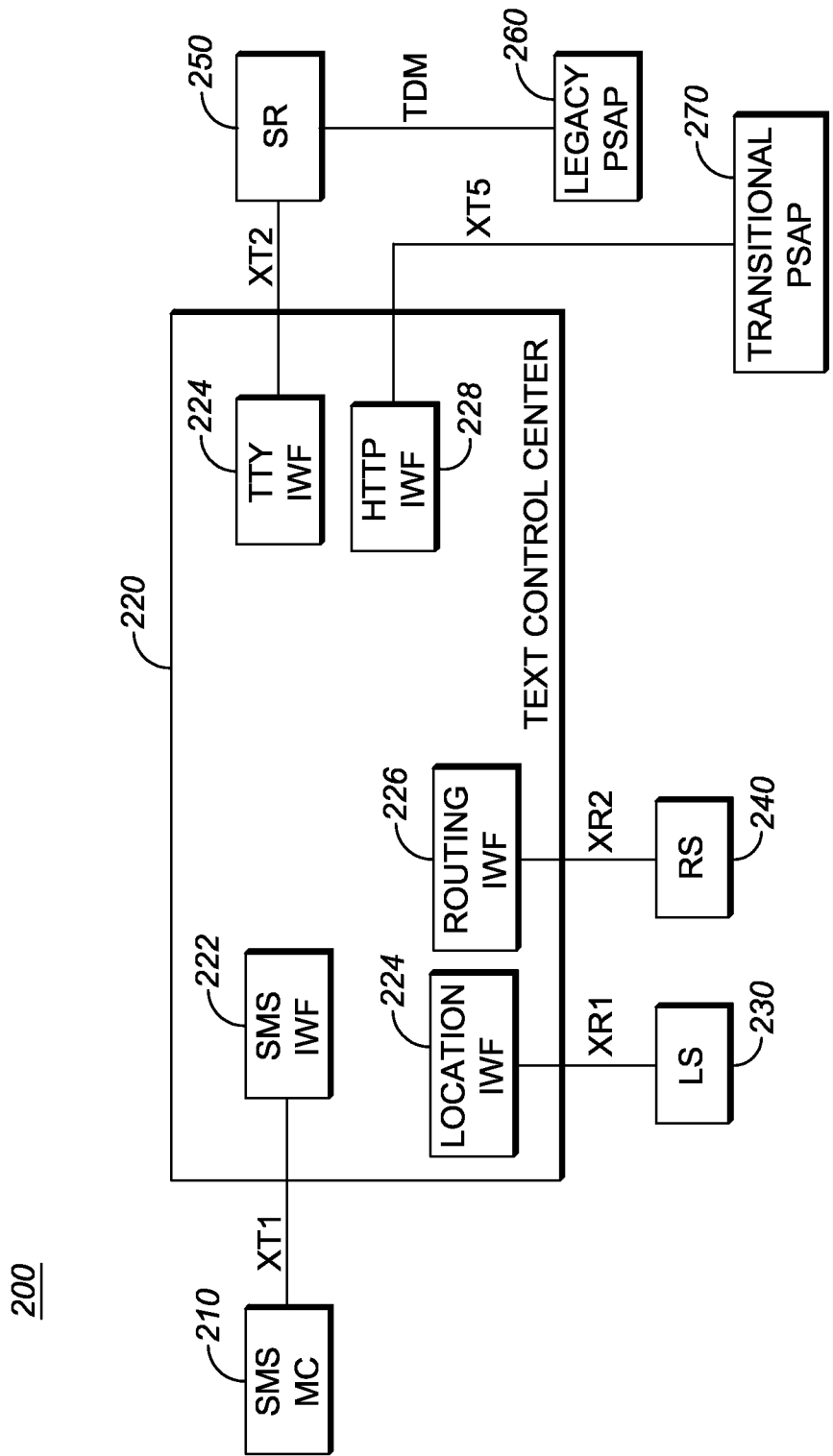
FIG. 2 is a text control center adapted to connect to one or more legacy public safety access points or one or more transitional public safety access points in accordance with some example embodiments.

Referring now to FIG. 2, that drawing shows a text control center adapted to connect to one or more legacy public safety access points 200 in accordance with some example embodiments. In the interest of simplicity, only one SMS MC and one legacy PSAP is shown. As shown in FIG. 2, a SMS message center 210 is coupled to TCC 220. As described above and shown in FIG. 1, each mobile terminal (e.g., MT 112, MT 122A, MT 122B, or MT 132) is connected to a radio access network which employs a SMS MC (e.g., SMS MC SMS MC 115, SMS MC 125, or SMS MC 135). The xt1 reference point (xt1) shown in FIG. 2 describes a reference point between SMS MC 210 and the TCC 220. The xt1 reference point is a bidirectional interface that allows a citizen-initiated SMS message to be transported through SMS MC 220 to TCC 220. In addition, the legacy PSAP 240 may response respond with a text message and the TCC 220 converts that text message to native SMS and forwards that message to the citizen through the SMS MC 210. In one example embodiment, the xt1 employs a short message peer-to-peer protocol (SMPP).

In FIG. 2, location-based services (LBS) are employed which provide a framework that specifies all the necessary network elements and entities, their functionalities, interfaces and communication messages that are required to implement the positioning functionality in a wireless network. LBS are network capabilities that enable the deployment of location-based (value-added) services. LBS are separate and distinct from E9-1-1 location services. When TCC 220 receives an initial native SMS message, it obtains location information from LS 230. It then uses that location to obtain routing instructions from RS 240. Then, TCC 220 converts the native SMS message to an appropriate protocol and initiates a dialogue with either legacy PSAP 260 and/or transitional PSAP 250 (via the emergency services network) through teletypewriter (TTY) interworking function (IWF) 224 and/or hypertext transfer protocol (HTTP) interworking function (IWF) 328.

Location server (LS) 230 is a functional element responsible for providing the location that can be used to route the text message to a PSAP. LS 230 may obtain a course location by obtaining cell site location, or may obtain the mobile device's location using commercial location-based services (LBS) (not shown) of the serving network. When queried by the TCC 220, LS 230 will invoke processes to obtain the location and return that location to the TCC 220 for routing.

An xr1 reference point is shown in FIG. 2 to describe the interface between TCC 220 and LS 230 which allows TCC 220 to query for location using the mobile terminal identifier. Some non-limiting examples of a mobile terminal identifier are; an international subscriber directory number (MSISDN), international mobile equipment identity (IMSI), mobile station roaming number (MSRN), local area identity (LAI), temporary mobile subscriber identity (TMSI), local mobile subscriber identity (LMSI), or cell identifier (CI) that was received from the SMS MC 210. The location interworking function (IWF) 225 coupled to TCC 220 queries with the mobile terminal identifier and LS 230 responds with a location. In one example embodiment, a mobile location protocol (MLP) is employed using a standard location immediate service (SLIP) of MLP that is used for requesting the location of one or more mobile devices (i.e., used when immediate response is required).

Routing server (RS) 240 is a functional entity which facilitates routing of SMS messages to the appropriate PSAP based on a location (i.e., information or data regarding a location). The location may be a course location or the granular position of the mobile device, depending upon the location technology employed. RS 240 supports a mechanism by which location information—either civic address or geo-coordinates and a service uniform resource name (URN) (i.e., urn:service:sos)—serves as an input to a mapping function that returns a URI used to route a text message toward the appropriate PSAP based upon the location provided by LS 230. A civic address is a house number, street address and community name while a geodetic location is a point, polygon, ellipse, circle or arc-band. However, example embodiments do not provide the civic address or geodetic location to the legacy or transitional PSAP.

The xr2 reference point describes the interface between the TCC 220 and RS 240 which allows TCC 220 to use the location it received from LS 230 to query RS 240 for routing instructions. In particular, the routing interworking function (IFW) couple to TCC 220 queries RS 240 regarding location and service URN and the RS 240 responds with a route URI that allows TCC 220 to route the messages to the appropriate emergency service network. The TCC 220 may be required to transpose the location received by the LS 230 to the location format required by the RS 240. In one example embodiment, a location-to-service translation protocol (LoST) is employed. More specifically, the LoST protocol is an XML-based protocol for mapping service identifiers and geodetic or civic location information to service contact URIs. In particular, it can be used to determine the location-appropriate Public Safety Answering Point (PSAP) for emergency services. In some embodiments, a findService request is employed by TCC 220 to query for location and the findServiceResponse is used by the RS 240 to return the location.

A. Legacy Public Safety Answering Point

Also as shown in FIG. 2, a legacy PSAP 260 is interconnected by way of a traditional time division multiplex (TDM) interface (e.g., TDM circuit-switched telephony) to a selective Router 250. Legacy PSAP 260 can also be coupled to an automatic location identification (ALI) database/gateway (not shown) by way of traditional PSAP-to-ALI interfaces. However, some example embodiments assume that such ALI functionality is not available to legacy PSAP 260. Accordingly, legacy PSAP 260 uses a centralized automatic message CAMA or (custom) integrated services digital network (ISDN) technology for delivery of text to 9-1-1 by use of TTY tones by way of TTY interworking interface 224.

Selective router (RS) 230 (e.g., E9-1-1 Tandem or Enhanced 9-1-1 (E9-1-1 Control Office) provides the tandem switching of E9-1-1 calls. That is, the E9-1-1 tandem controls delivery of the voice call with ANI to the PSAP and provides selective routing, speed calling, selective transfer, fixed transfer and certain maintenance functions for each PSAP. ANI is automatic number identification the telephone number associated with the access line from which a call originates. However, example embodiments assume that such ANI is not able to resolve the identity of the citizen caller who originates a text message from a mobile terminal (as such the caller's ID which is not available to legacy PSAP 260).

The xt2 reference point is located between TCC 220 and the SR 230 and delivers text to a legacy PSAP using TTY. The TCC 220 must establish a call emulating wireline compatibility mode (WCM) or non-call associated signaling (NCAS) as defined by J-STD-034. In particular, TCC 220 creates a reference identifier (pANI) and initiates a call to SR 230. Once the call is established, TCC 220 initiates the TTY handshake within the media. The text message is then sent character by character to the legacy PSAP 240 via the SR 230. Moreover, the legacy PSAP 260 may respond character by character to TCC 220 through SR 230. TCC 220 then formats a message back towards the citizen in the form of a native SMS message by way of the SMS interworking interface 220 to a SMS message center. In one example embodiment, the xt2 reference point employs a signal system (SS) 7 protocol.

B. Transitional Public Safety Answering Point

FIG. 2 shows a transitional PSAP 270 coupled to a HTTP interworking function (IWF) 228. An xt5 reference point describes the interface between the transitional PSAP 270 and HTTP IWF 228. The HTTP IWF 228 coupled to TCC 220 utilizes the Internet to send and receive text messages created by over-the-top SMS text messaging applications, as well as other native SMS messages applications (converted to text messages) which do not include location information sent to transitional PSAP 270.

Figure 3:
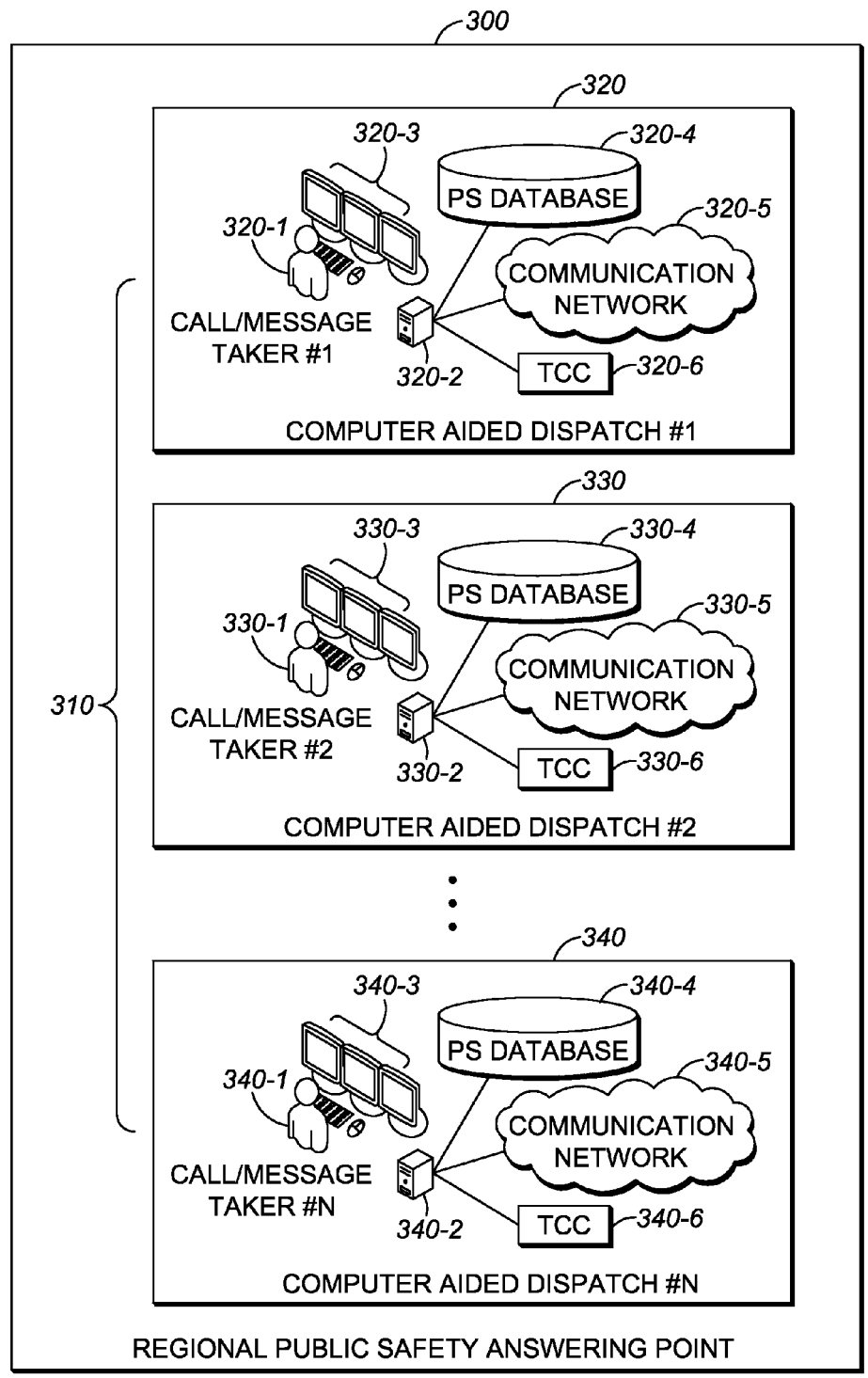
FIG. 3 is an illustration of a regional public safety access points adapted for providing context-aware linkage between native SMS messages and a public safety incident in accordance with some example embodiments.

Referring now to FIG. 3 further detail is provided regarding a regional public safety answering point shown in FIG. 1 in accordance with example embodiments. Regional PSAP 300 illustrates particular aspects of some embodiments where a plurality of computer aided dispatch (CAD) units 310 are adapted to provide context-aware linkage between native short message service messages and a public safety incident. That is, each regional PSAP shown in FIG. 1 comprises a plurality of CAD units 310, such as CAD 320, CAD 330 and CAD 340.

As shown in FIG. 3, call/message takers 320-1, 330-1 and 330-3 are highly trained 9-1-1 dispatcher skilled in handling emergency calls and/or messages from citizens is a predetermined region and routing those calls and/or messages to first responders. Each CAD unit includes one or more computers such as 320-2, 330-2, and 330-3 where each computer is coupled to a plurality of displays, such as displays 320-3, 330-3, and 340-3. Each of the plurality of display screens (e.g., two or more displays) allows a call/message taker to experience a swivel free interface with an emergency services CAD computer program by way of a plurality of dialogue windows displayed on high resolution monitors, for example, as shown in FIG. 5 and described below. Each computer is coupled to a one or more local or remote public safety databases, such as 320-4, 330-4 and 340-4. Also, each computer is coupled to one or more communication networks, such as 320-5, 330-5, and 340-5. Non-limiting examples of communication networks include the Internet as well as secure intranets such as federal, state, local public safety (and private public safety consulting firms), and local/remote data bases as well coupled to TCC 150. The functional elements of each CAD emergency services call/message taker/dispatch computer program will be described in more detail below with reference to FIG. 4 (as well as through several examples of emergency text message dialogue among citizens via a mobile terminal and a message taker via a CAD program at a PSAP).

Figure 4:
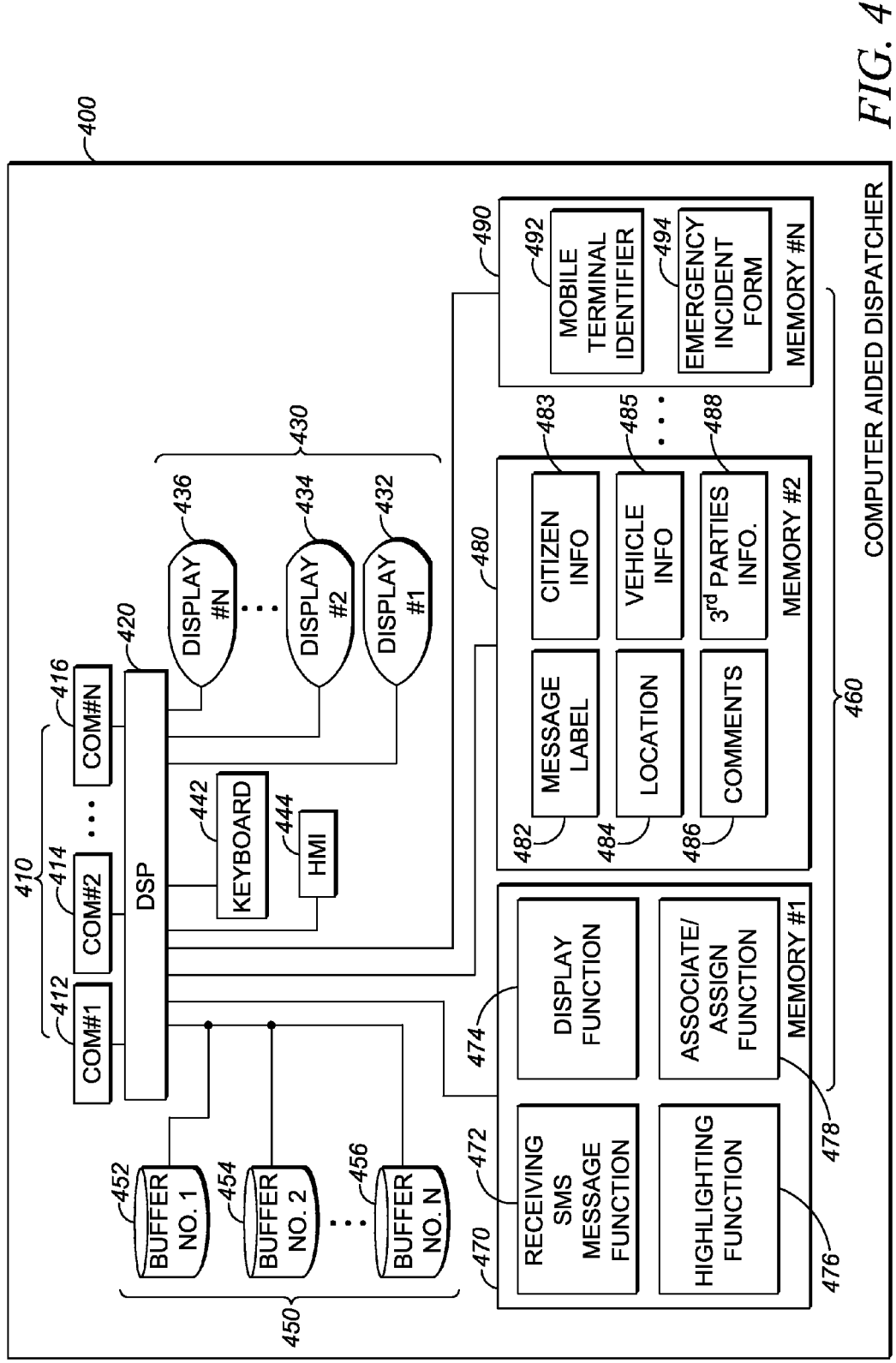
FIG. 4 is a block diagram of a computer aided dispatcher adapted for providing context-aware linkage between native SMS messages and a public safety incident in accordance with some example embodiments.
Figure 5:
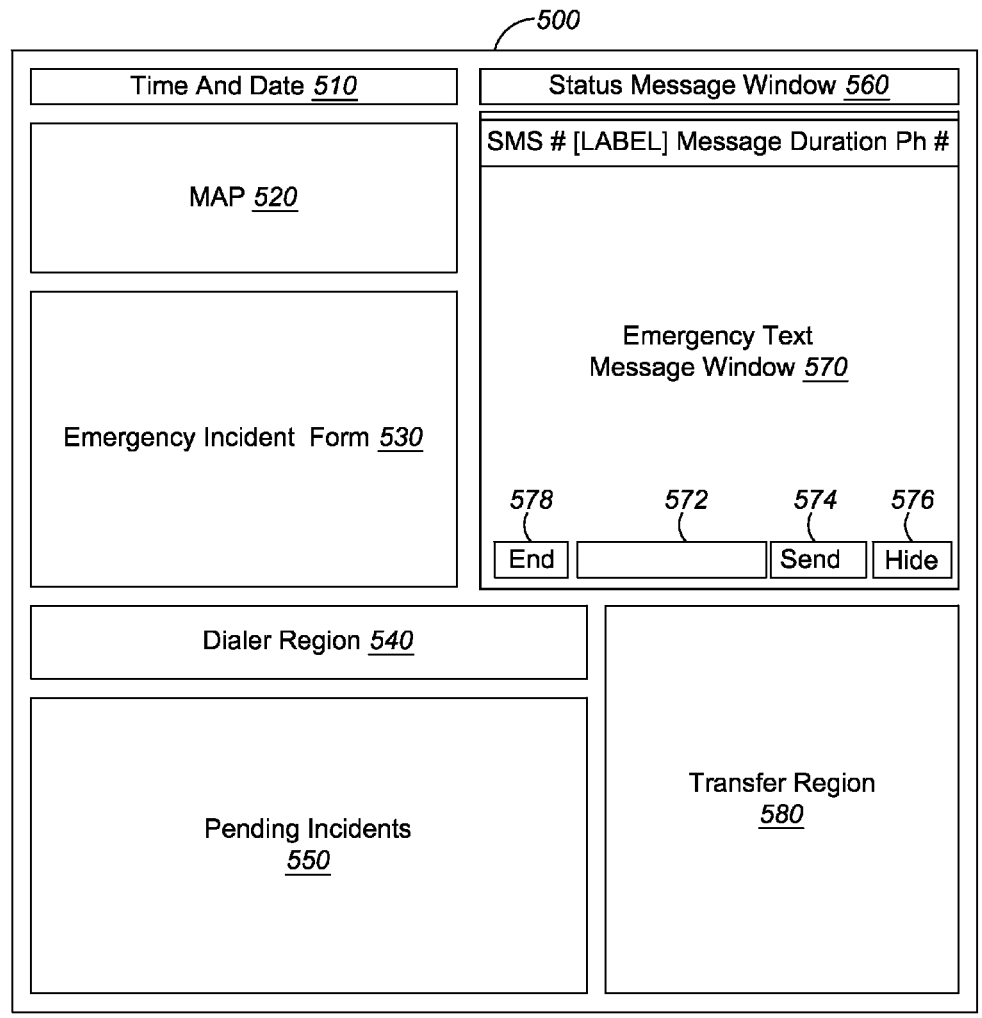
FIG. 5 is an illustration of an example of a graphical user interface of a public safety computer aided dispatch computer program adapted for providing context-aware linkage between native short message service messages and a public safety incident in accordance with example embodiments.

Referring now to FIG. 4, a computer aided dispatcher (CAD) 400 suitable for providing context-aware linkage between native short message service messages and a public safety incident is shown in accordance with some example embodiments. CAD 400 includes one or more processing devices, such as at least one digital signal processor (DSP) 410. DSP 410 can be a microcontroller, microprocessor or field programmable gate array or the like.

Also included is at least one computer-readable memory tangibly embodying a program of instructions executable by WDC 400. For the sake of simplicity in illustrating example embodiments, a plurality of memories 460 is shown in FIG. 4. Each such memory is adapted together with DSP 420 to provide context-aware linkage between native short message service messages and a public safety incident. As will be appreciated by one skilled in the art, aspects of the present disclosure may be embodied as an apparatus that incorporates some software components. Accordingly, some embodiments of the present disclosure, or portions thereof, may combine one or more hardware components, such as microprocessors, microcontrollers, or digital sequential logic devices (such as a processor with one or more software components such as program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

For example, a first computer-readable memory 470 stores a plurality of computer programs, such as a method, program of function for a computer aided dispatcher. In one example embodiment, a first receiving short message service function 472 is provided for receiving, by a public safety answering point, a plurality of emergency short message service (SMS) messages from one or more citizens over a wireless communication network, each emergency SMS message including a mobile terminal identifier. For example, a plurality of communication ports 410 are provided, each adapted to provide connectivity to remote communication networks. For example, COM 412 could be employed by to access the Internet by a transitional public safety answering point (P SAP) to connect to a text control center (TCC) employing a HTTP IWF. Alternatively, COM 414 could be employed by a legacy PSAP to connect to a TCC employing a TTY IWF.

Also shown in FIG. 4, a display function 474 is adapted to display each emergency SMS message in one or more display dialogue windows. The display function is further adapted to display the dialogue windows on one or more monitor displays 430, such as display 432, display 434, and/or display 436. A highlighting function 476 is adapted to receive a command to highlight a portion of at least one of the emergency SMS message. The command to highlight a portion of the emergency SMS message can be input by way of a human machine interface (HMI) 444, such as mouse or other pointer device and/or input from a keyboard 444. Each highlighted portion is stored into one or more buffers, such as a plurality of buffers 450, (e.g., buffer 452, buffer 454, and buffer 456). The highlighted portion can be all or less than all of the emergency SMS message as determined by a call/message taker (e.g., 9-1-1 operator). The first memory 470 also includes an associate/assign function 478 adapted to receive a command to associate the highlighted portion with one of a plurality of context fields in an emergency incident information report, the associated highlighted portion, selected context field and mobile terminal identifier stored in memory.

A second computer-readable memory 480 is adapted to store a plurality of context fields. For example, a message identifier label 482 which allows a call/message taker to label a text message dialogue for quickly identifying the SMS message. The call/message taker could selectively highlight the first four words of the citizen texter's SMS message, or select key words such as "someone is being robbed at gunpoint." Another possible context field can include an initial caller field 483 which would store citizen information such as the individuals first name an individual filed, the surname in an individual field, both the first name and surname in one field, alternative phone number, address, city and apartment or unit number. Yet another possible context field is an incident location field 484 which can include the street address, apartment or unit number and city information. In some embodiments, information pertaining to cross street information or names of parks, institutions or other landmarks can be included. In further embodiments, a street address, intersection, or common place associated with the incident may be included, or a city associated with the incident, or an apartment number or unit associated with the incident.

Further functions can be provided to enhance the identification of the location of the incident such as a query, verifying or mapping function (which can be adapted to access local or remote mapping data or related global positioning resources). For example, COM 416 could be employed to access mapping data or related global positioning sources. Another context field can include a plurality of fields describing vehicles 485 involved in an emergency incident (e.g., make, model, and year). Third parties, witnesses and/or victims or alleged perpetrators 488 can be also included in one or more context fields.

Figure 6:
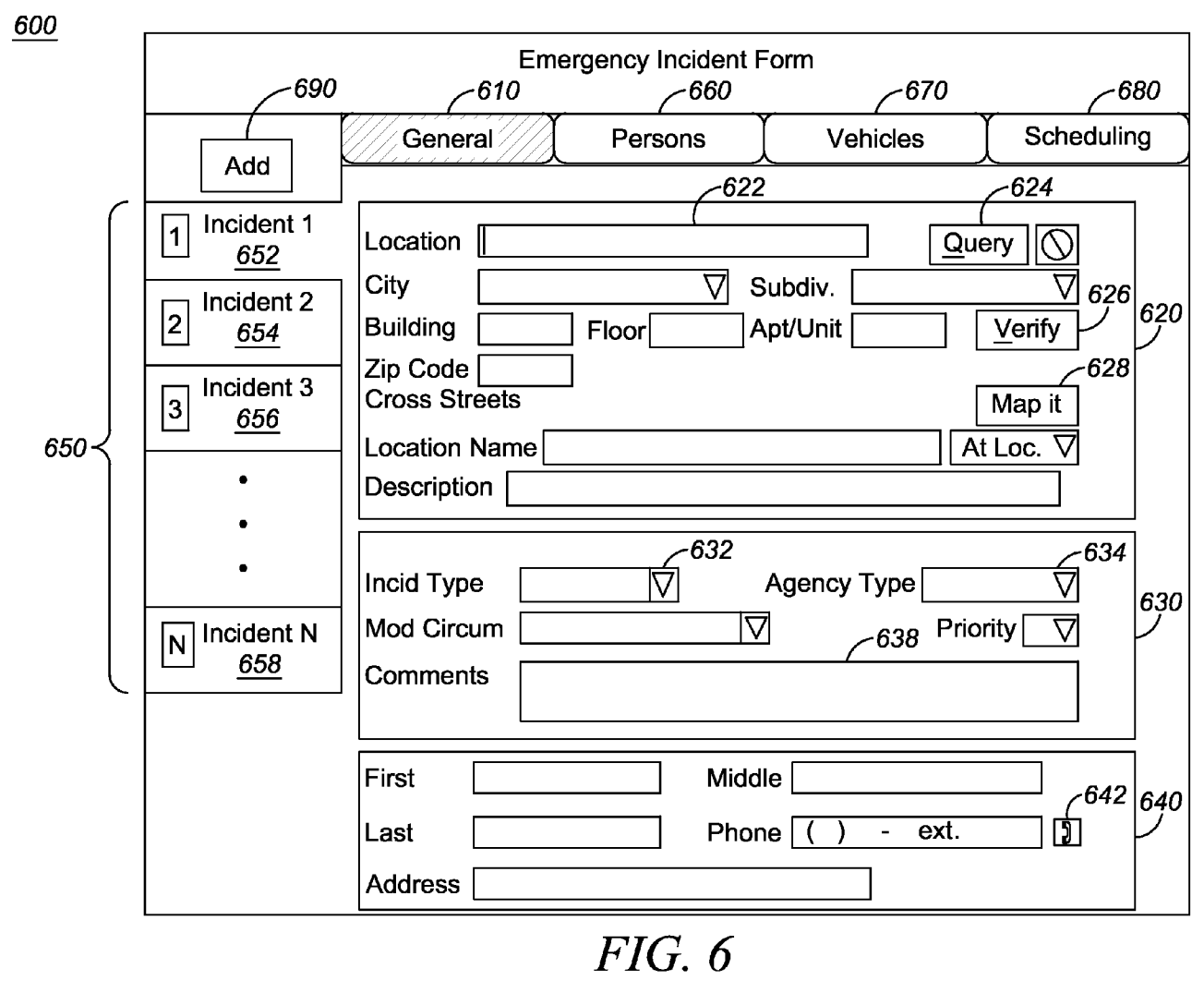

A third computer-readable memory 490 is adapted to store a plurality of mobile terminal identifiers 492. Some non-limiting examples of a mobile terminal identifier are; an international subscriber directory number (MSISDN), international mobile equipment identity (IMSI), mobile station roaming number (MSRN), local area identity (LAI), temporary mobile subscriber identity (TMSI), local mobile subscriber identity (LMSI) or cell identifier (CI) that was received from the SMS message center (MC). Also stored in the third computer-readable memory 490 are plurality of emergency incident forms 494. An example of an emergency incident form is shown in FIG. 6, which is described in more detail below.

CAD 400 can be located on a standalone computer, laptop or other computer device. Alternatively, CAD 400 can be located on a remote server and accessed by way of a locally installed client program, or by way of one or more emulated client sessions over a broadband connection between a plurality of computer nodes and a server or several applications stored in a distributed communication network. Another example embodiment can include a program storage device readable by a machine, tangibly embodying a program of instructions executable by the machine for causing performance of operations in accordance with example embodiments.

Several non-limiting examples of CAD programs (and a description of non-limiting example computer program graphical user interfaces) which provide context-aware linkage between native short message service messages and a public safety incident will be described in accordance with example embodiments.

Referring to FIG. 5, a monitor screen is shown displaying a plurality of public safety dialogue windows 500 which are discrete modules of a computer aided dispatch program adapted for providing context-aware linkage between native short message service messages and a public safety incident in accordance with example embodiments. In one example embodiment, each one of the plurality of public safety dialogue windows 500 can be selectively moved, resized or minimized (hidden) within the area of the monitor screen or moved to one or more monitor screens (e.g., FIG. 3, monitors 320-3). In an alternative embodiment, a plurality of safety dialogue windows can be part of a monolithic module.

In FIG. 5, a time and date dialogue window 510 is provided which is adapted to display the correct time and date for a call/message taker's ready reference. The time and date dialogue window 510 can be resized and/or locked, as well as stylistically presented (e.g., the type of clock selected can be analog, digital or another type). The time and date dialogue window 510 can optionally include a stop watch, as well as other time and date functionality, such as a world clock, time zone schematic and a time or date duration calculator. An emergency incident form 530 is also shown which is described in more detail below as well as shown in FIG. 6. A dial region dialogue window 540 is provided to allow the call/message taker to selectively call a citizen caller or other first responders or various third parties. Dial region dialogue window 540 can include multi-line support, as well as provide a plurality of typical calling features such as a hold button, intercom button, speaker button, a call conferencing button, a transfer button, a park button, a release button as well as a one or more programmable speed dial buttons. In one example embodiment, a speed dial button can be one or more speed dial buttons associated with each native SMS message received by the message/call taker from one or more citizens concerning an emergency incident. Dial region dialogue window 540 can also display the call number and call duration.

Also shown in FIG. 5, is a pending emergency incidences dialogue window 550 which displays a summary of incidents logged by a message/call taker. The pending emergency incidences dialogue window 550 can also a summary of incidents logged by other message/call takers in the same regional public safety answering point, a secondary PSAP, or any other PSAP in a public safety communication network or emergency services IP network (esIPnet). The pending emergency incidences dialogue window 550 can provide a summary list of emergency incidents. That summary list can include a number of categories of incident information, such as an incident number, an incident state (e.g., active, closed), an incident type (e.g., accident, crime type such as burglary, robbery, etc., as well as alarm activation, fire and EMS), an incident location and a reference number or unit number of a first responder handling a 9-1-1 call or SMS message. Each of the categories of incident information is subject to selective sorting by column or row by the message/call taker.

A message status window 560 is provided for displaying a summary of one or more emergency SMS text messages received by a regional PSAP. Further detail is provided in the description below and in FIG. 7. An emergency text message window 570 is displayed, providing an opportunity for a text-based dialogue between a citizen and a call/message taker. That is, as described above and shown in FIG. 1 and FIG. 2, a citizen can send a native SMS text message from his or her mobile terminal by entering a text message and code "9-1-1." Thereafter the text control center (TCC), as shown in FIG. 2 for example, directs the native SMS text message to a regional PSAP (e.g., legacy or transitional PSAP) after converting the original message into a format that PSAP can understand. A call/message taker adaptively interacts with a CAD GUI in accordance with example embodiments to reply back to the citizen by way of the TCC. Accordingly, the call/message taker can enter text in whitespace 572 to reply to the citizen and select the send button 574. Should call/message taker need to focus on another task, or need to conduct research on a reported incident emergency text message, the window 570 can be minimized by selecting the hide button 576. If call/message taker determines that the message dialogue is complete, he or she can select the end button to close the emergency text message window 570. Regardless of the outcome of the message dialogue, the transcript of the message will be saved in memory, together with a label, message duration and a citizen caller's phone number as will be described in more detail below with reference to FIG. 7. The mobile terminal identifier of the citizen will also be stored in memory with the archived message transcript which can be transparent or hidden form the call/message taker.

Also shown in FIG. 5 is a transfer region dialogue window 580 which can provide various selectable transfer buttons to assign an incident to one or more first responders or other public safety support personnel. For example, a selectable transfer buttons can be provided to contact first responders such as various levels of law enforcement (e.g., local police, county police, state police transit police, the Federal Bureau of Investigation and the like), one or more fire departments, and emergency services paramedics and the like. Additional selectable transfer buttons can be provided to contact language translation professionals, animal control, and the department of public works. In one example embodiment, selecting one of the selectable transfer buttons adds the selected first responders or other public safety support personnel into the text message dialogue.

FIG. 6 is an illustration of an example of a public safety emergency incident report 600 adapted for providing context-aware linkage between native short message service messages and a public safety incident in accordance with example embodiments. As shown in FIG. 6, the public safety emergency incident report 600 includes several layers of form-Tillable information such as a plurality of tabs 610. For example, a general tab 610 which allows a call/message taker to input incident location information 620, such as by entering the street address or landmark address into whitespace 622. Alternatively, the call/message taker can input a city or subdivision, building number, floor number, apartment or unit number, zip code. The call/message taker can look-up the inputted location address by selecting a query button 624 (e.g., determine that the address exists), verify the address by selecting a verify button 626 (e.g., determine if a dwelling or business is located at the address as opposed to a vacate lot) or map the address by selecting a map it button 628. The map it button 628 can access locally stored map programs or remote global positioning satellite-based map program. After that access is made either a map program can be accessed or a map of the specific location incident can be displayed in a pop-up window. Additional information can be input into form-Tillable fields in the incident location information 620, such as a location name (e.g., victim's home, location of the accident or crime and the like) together with additional location description, as well as an indication of whether the citizen is still at the incident location.

The general tab 610 can also include one or more form-fillable fields adapted to receive input related to the type of incident 630. For example, an incident type label 632 can be identified by selecting an incident type drop-down menu 632 (e.g., crime, fire, accident, alarm activation, and the like). A recommended responding agency can be selected by selecting an agency type down-down menu 634 (Police, Fire, EMS and the like). Comments can be entered into an incident comment white space 636. Additional comments can be added as the incident progresses over time, as well as a change in the incident can be indicated by selecting a modify circumstances drop-down menu 638.

The general tab 610 can also include one or more initial caller identification form-Tillable fields 640. For example, the first name, middle name, surname, address and telephone number can be input into one or more form-fillable fields. A call button can be provided to allow a call/message taker to quickly call the citizen engaged an emergency text message dialogue. For example, the number can be the mobile terminal number from which the citizen is texting, another mobile terminal or a telephone connected to a landline.

After inputting the information from a message dialogue, an incident add button 612 can be selected which will assign a particular incident a unique incident number associated with the emergency incident. An emergency incident form 660 can be adapted to provide an interface to a plurality or series of pending emergency incident forms 650. For example, a first incident 652, a second incident 654, a third incident 656 and include a predetermined maximum or minimum number of incidents 658 as determined by program settings. Optionally, archiving of inactive incidents can be provided after a set number of hours or days.

Additional optional tabs such as a person tab 660, vehicle tab 670 and a schedule tab 680 can be provided and associated to each emergency incident form. For example, additional victims, perpetrators or witnesses can be input into a plurality of fields providing names, address, telephone numbers and physical descriptions of those individuals. In the event of a car accident or stolen car, vehicle description information such as the make, model, year and color as well as license tags can be input into a plurality of form-Tillable fields under the vehicle tab 670. A scheduling tab 680 can be provided in the event of a situation where a citizen requests a police patrol at a specific time of the day or night.

Referring now to FIG. 7, a status text window suitable for displaying summary data of one or more SMS message dialogues 700 is shown in accordance with example embodiment. That is, FIG. 7 is a status text window similar to that shown in FIG. 5 and described above. However, more detail is now provided to that status text window for the purpose of providing a description of the operation of example embodiments with reference to FIG. 8, and FIG. 12 to FIG. 14 below.

Additionally, reference back to FIG. 1, FIG. 5 and FIG. 6 helps to illustrate the text message flows between a plurality of citizens and a regional public safety answering point (legacy or transitional PSAP).

As shown in FIG. 7, a first text message dialogue 710 includes a reference number (i.e., SMS #1), a message label (i.e., "My house is on fire"), a message duration (i.e., 56 seconds) and the mobile telephone number of the originating mobile terminal (i.e., (708) 555-5551). A second text message dialogue 720 includes a reference number (i.e., SMS #2), a message label (i.e., "just got into car accident"), message duration (i.e., 1 minute, 1 second) and the mobile telephone number of the originating mobile terminal (i.e., (708) 555-5552). A third text message dialogue 730 includes a reference number (i.e., SMS #3), a message label (i.e., "Can you send an ambulance"), a message duration (43 seconds) and the mobile telephone number of the originating mobile terminal (i.e., (708) 555-5553). A fourth text message dialogue 740 includes a reference number (i.e., SMS #4), a message label (i.e., "someone is being robbed at gun"), a message duration (i.e., 1 minute, 45 seconds) and the mobile telephone number of the originating mobile terminal (i.e., (708) 555-5554).

Figure 8:
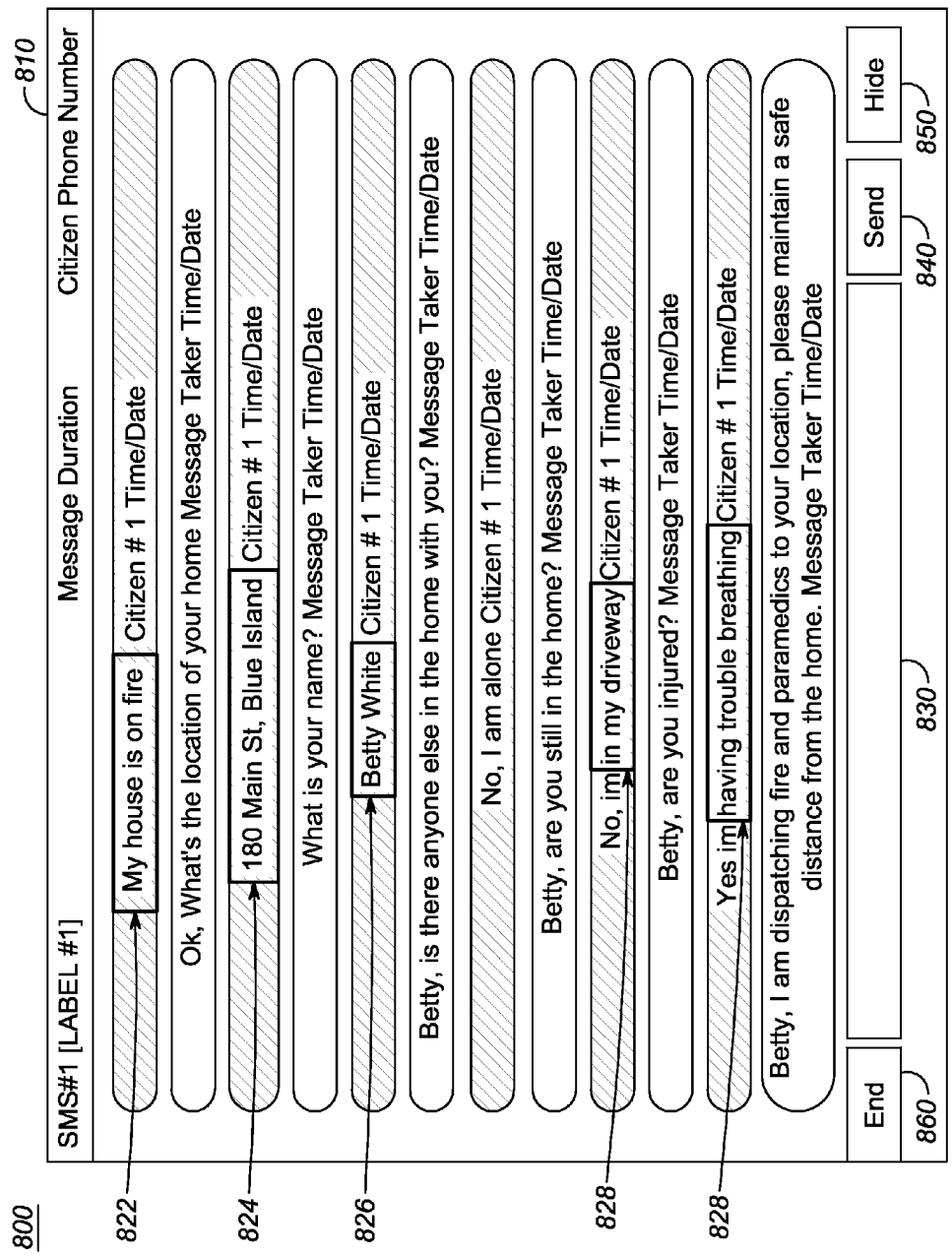
FIG. 8 is an illustration of an example native short message service dialogue between a citizen and a call/message taker regarding a house fire in accordance with example embodiments.

Referring now to FIG. 8, a related native SMS message pop-up window 800 to FIG. 7's first text message dialogue 710, is shown (i.e., by selecting first text message dialogue 710 by way of a HMI or various short-cut key strokes). FIG. 8 contains a transcript of a message dialogue from a citizen reporting a fire in their home. For example, referring back to FIG. 1, the citizen could be citizen #1 (33) whose home 111 is on fire.

In one example embodiment, a call/message taker can interact with citizen #1 (33) by entering responses in white space 830 and selecting the send button 840, periodically selecting the hide button 850 if required to perform another task, and selecting the end button after eliciting the necessary information. In one example embodiment, the call/message taker can highlight a portion of each segment of citizen #1's initial message or subsequent responses. That information can be readily inserted into a form-fillable incident form such as that shown in FIG. 6 and described above. The highlighted portion can be all or less than all of the initial message or subsequent responses. For example, in FIG. 8 citizen #1 (10) makes the initial statement "my house is on fire." In response, a call/message taker highlights that statement in its entirety (i.e. my house is on fire) 822. By way of right clicking on a mouse, or entering one or more keystroke combinations on a keyboard, an option menu 900 appears which provides several options. That is, the call/message taker can place the highlighted portion into memory by way of a copy comment 912 which saves "My house is on fire" 822 into one or more buffer memories. Alternatively, the call/message taker can set the highlighted portion as a label 914 suitable for quickly identifying the incident which can be saved in into permanent memory, such as read only memory. The resulting designated label will appear at the top of the native SMS message pop-up window 800 shown in FIG. 8 and in the first text message dialogue 710 in the related status text window 700 shown in FIG. 7.

Call/message taker can next proceed to do one of three tasks: (1) start an open emergency incident report (934), (2) associate additional portions of the initial or subsequent responses from citizen #1 (10) to an open emergency incident report (932), or (3) associate additional portions of the initial or subsequent responses from citizen #1 (10) to specific form-fillable fields in an emergency incident report 920.

Figure 10:
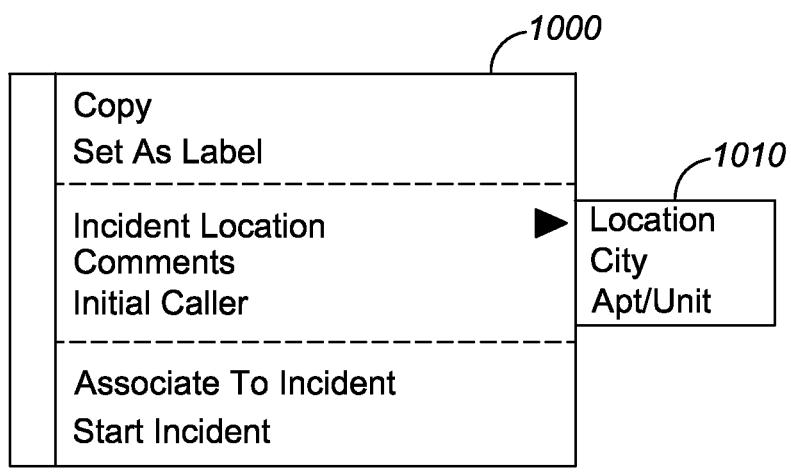
FIG. 10 is an illustration of an incident location selection dialogue box in accordance with example embodiments.

For example, the call/message taker can highlight a portion of a second text message from citizen #1 (10) such as the location of the house fire 824. Referring to FIG. 10, by way of right clicking on a mouse, or entering one or more keystroke combinations on a keyboard, an option menu 1000 appears and provides for selection of the incident location 1010. The call/message taker associates the highlighted address, 180 Main St., Blue Island, to a location field. Referring back to FIG. 6, the associated highlighted address, 180 Main St., Blue Island, is inserted in the location field 622. The call/message taker can optionally select the hide button 850 to perform this task, or alternatively, not hide the window by moving the emergency incident form on to an available portion of one of the plurality of monitor displays.

Figure 11:
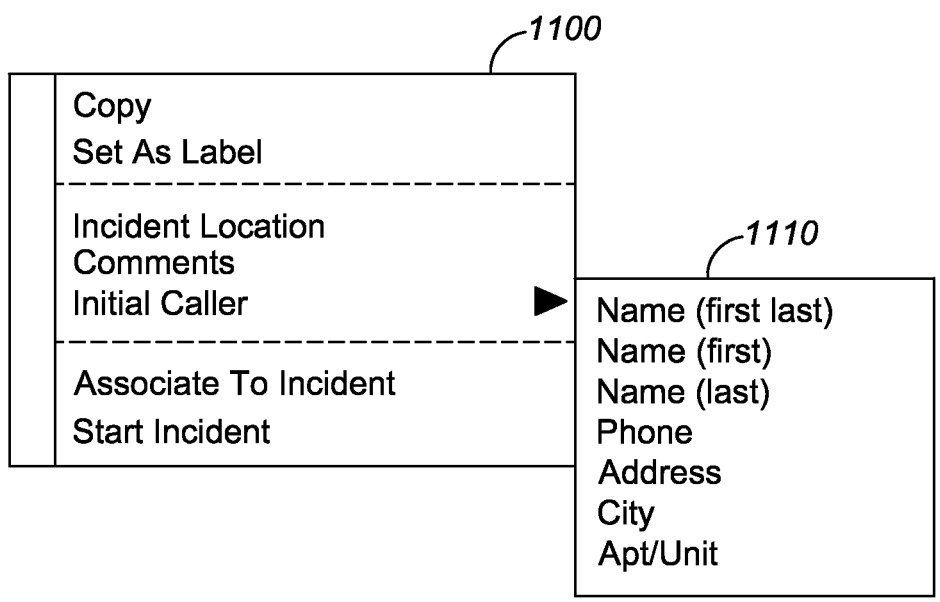
FIG. 11 is an illustration of an initial caller selection dialogue box in accordance with example embodiments.

The call/message taker can next highlight a portion of a fourth text response from citizen #1 (10) (e.g., the name of the citizen, which is Betty White) 826. Referring to FIG. 11, by way of right clicking on a mouse, or entering one or more keystroke combinations on a keyboard, an option menu 1100 appears which allows for selection of the initial caller 1110. Referring back to FIG. 6, the associated highlighted name is inserted in name field 640. The call/message taker can again optionally select the hide button 850 to perform this task, or alternatively, not hide the window by moving the emergency incident form on to an available portion of one of the plurality of monitor displays.

Figure 9:
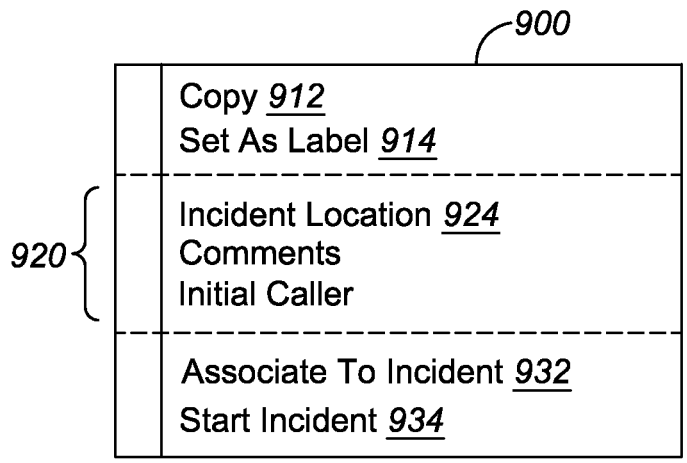
FIG. 9 is an illustration of a context selection dialogue box in accordance with example embodiments.

The call/message taker can next highlight a portion of an eighth and tenth text response from citizen #1 (10), which provided information pertaining to the current location of the citizen, as well as her current state of health 828. Referring to FIG. 9, by way of right clicking on a mouse, or entering one or more keystroke combinations on a keyboard, an option menu 900 appears where a comment field 924 is selected. Referring back to FIG. 6, the associated highlighted comments (i.e., "in my driveway" and "having trouble breathing") is inserted in the comment field 636. The call/message taker can optionally edit the comments provided by citizen #1, such as prepending "the home owner is" to the comment "in my driveway," deleting the word "my" along the way, and leaving the comment "having trouble breathing").

Figure 12:
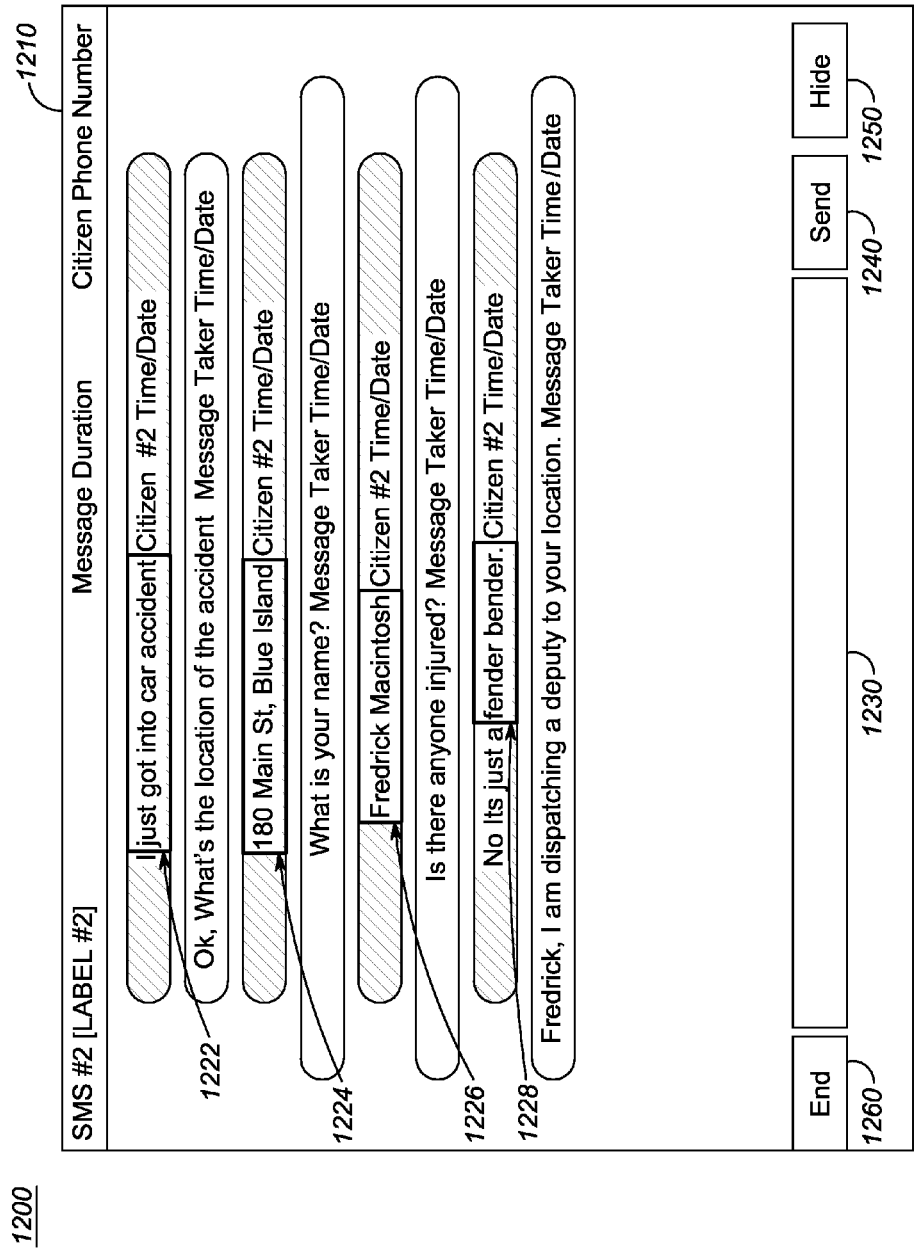
FIG. 12 is an illustration of another example of a native short message service dialogue between a citizen and a call/message taker involving a car accident in accordance with example embodiments.
Figure 13:
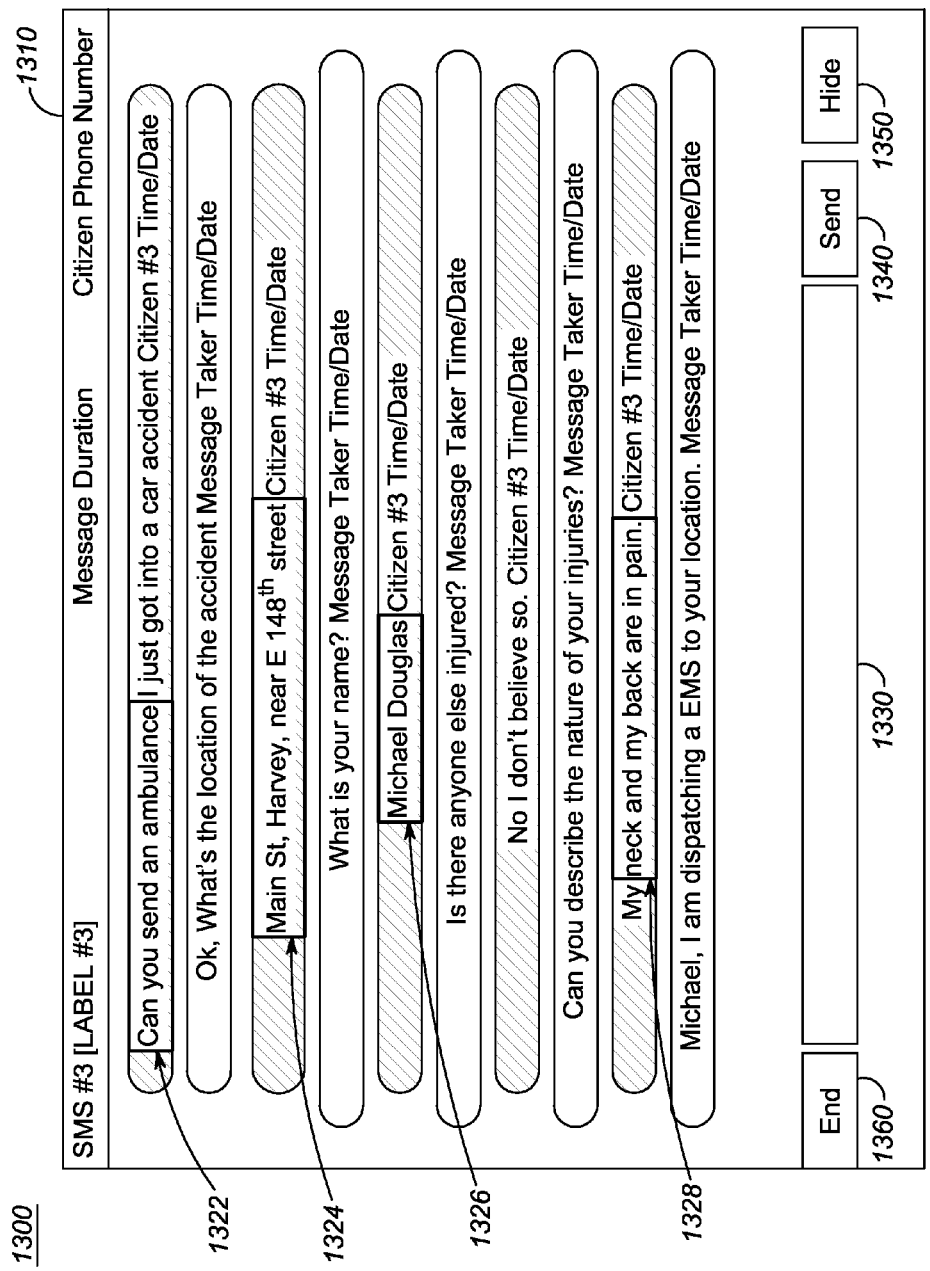
FIG. 13 is an illustration of an example of a native short message service dialogue between a citizen and a call/message taker regarding the same car accident described in FIG. 12 in accordance with example embodiments.

Referring now to FIG. 12 and FIG. 13, an example illustration is now provided which provides context to two native SMS messages dialogues that were received by a regional PSAP and that both related to a single incident, such as incident number 2 (120) shown in FIG. 1.

Referring now to FIG. 12, a native SMS message pop-up window 1200 related to FIG. 7's second text message dialogue 720 is shown. That pop-up window is displayed by selecting second text message dialogue 720 by way of a HMI function or various short-cut key strokes. FIG. 12 contains a transcript of a message dialogue from a citizen reporting a car accident. For example, referring back to FIG. 1, the citizen could be citizen #2 (22) who is involved in a multi-car accident.

In one example embodiment, a call/message taker can interact with citizen #2 (22) by entering responses in white space 1230 and selecting the send button 1240, periodically selecting the hide button 1250 if required to perform another task, and selecting the end button 1260 after eliciting the necessary information. In one example embodiment, the call/message taker can highlight a portion of each segment of citizen #2's initial message or subsequent responses. That information can be readily inserted into a form-Tillable incident form, such as that shown in FIG. 6 and described above. The highlighted portion can be all, or less than all, of the initial message or subsequent responses. For example, in FIG. 12 citizen #2 (22) makes the initial statement "I just got into car accident." In response, a call/message taker highlights part of that statement (i.e., "just got into car accident") 1222. By way of right clicking on a mouse, or entering one or more keystroke combinations on a keyboard, an option menu 900 appears which provides several options. That is, the call/message taker can place the highlighted portion into memory by way of a copy comment 912 which saves "just got into car accident" 1222 into one or more buffer memory. Alternatively, call/message taker can set the highlighted portion as a label 914 suitable for quickly identifying the incident which can be saved in into permanent memory, such as a read only memory. The resulting designated label will appear at the top of the native SMS message pop-up window 1200 shown in FIG. 12 and in the second text message dialogue 712 in the related status text window 700 shown in FIG. 7.

The call/message taker can next proceed to do one of three tasks: (1) start an open emergency incident report (934), (2) associate additional portions of the initial or subsequent responses from citizen #2 (22) to an open emergency incident report (932), or (3) associate additional portions of the initial or subsequent responses from citizen #1 to specific form-fillable fields in an emergency incident report 920.

For example, the call/message taker can highlight a portion of a second text message from citizen #2 (22) which is the location of the car accident 1224. Referring to FIG. 10, by way of right clicking on a mouse or entering one or more keystroke combinations on a keyboard, an option menu 1000 appears where the incident location 1010 can be selected. The call/message taker associates the highlighted address, 180 Main St., Blue Island, to a location field. Referring back to FIG. 6, the associated highlighted address, 180 Main St., Blue Island, is inserted in location field 622. The call/message taker can optionally select the hide button 850 to perform this task, or alternatively, not hide the window by moving the emergency incident form on to an available portion of one of the plurality of monitor displays.

The call/message taker can next highlight a portion of a fourth text response from citizen #2 (22), which is the name of the citizen (i.e., Fredrick Macintosh) 1226. Referring to FIG. 11, by way of right clicking on a mouse, or entering one or more keystroke combinations on a keyboard, an option menu 1100 appear where initial caller 1110 is selected. Referring back to FIG. 6, the associated highlighted name is inserted in the name field 640. The call/message taker can again optionally select the hide button 850 to perform this task, or alternatively not hide the window by moving the emergency incident form on to an available portion of one of the plurality of monitor displays.

The call/message taker can next highlight a portion of a third text response from citizen #2 (22), which is information pertaining to the state of health of citizen #2 (22) and that of any other individual involved in the car accident (i.e., "fender bender) 1228. Referring to FIG. 9, by way of right clicking on a mouse, or entering one or more keystroke combinations on a keyboard, an option menu 900 appears where the comment field 924 is selected. Referring back to FIG. 6, the associated highlighted comment (i.e., "fender bender") is inserted into the comment field 636. The call/message taker can optionally edit or add text to this comment, such as appending the words "no injuries to report" to citizen #2's statement "just a fender bender."

Referring now to FIG. 13, a related native SMS message pop-up window 1300 to FIG. 7's third text message dialogue 730 is shown. That pop-up window is displayed by selecting the third text message dialogue 730 by way of a HMI function or various short-cut key strokes. FIG. 13 contains a transcript of a message dialogue from a citizen reporting the same car accident as reported by another citizen. This information may not be immediately apparent to the call/message taker. For example, referring back to FIG. 1, the citizen could be citizen #3 (24) who is involved in the multi-car accident with citizen #3 (24).

In one example embodiment, a call/message taker can interact with citizen #3 (24) by entering responses in white space 1330 and selecting the send button 1340, periodically selecting the hide button 1350 if required to perform another task, and, finally, selecting the end button 1360 after eliciting the necessary information. In one example embodiment, the call/message taker can highlight a portion of each segment of citizen #3's initial message or subsequent responses. That information can be readily inserted into a form-Tillable incident form such as that shown in FIG. 6 and described above. The highlighted portion can be all, or less than all, of the initial message or subsequent responses. For example, in FIG. 13, citizen #3 (24) makes the initial statement "I just got into car accident." In response, a call/message taker highlights part of that statement (i.e., "Can you send an ambulance") 1322. By way of right clicking on a mouse, or entering one or more keystroke combinations on a keyboard, an option menu 900 appears which provides several options. That is, the call/message taker can place the highlighted portion into memory by way of a copy comment 912 which saves "Can you send an ambulance" 1322 into one or more buffer memories. Alternatively, the call/message taker can set the highlighted portion as a label 914 suitable for quickly identifying the incident which can be saved in a permanent memory, such as read only memory. The resulting designated label will appear at the top of the native SMS message pop-up window 1300 shown in FIG. 13 and in the third text message dialogue 732 in the related status text window 700 shown in FIG. 7.

The call/message taker can next proceed to do one of three tasks: (1) start an open emergency incident report (934), (2) associate additional portions of the initial or subsequent responses from citizen #2 (22) to an open emergency incident report (932), or (3) associate additional portions of the initial or subsequent responses from citizen #1 (10) to specific form-fillable fields in an emergency incident report 920.

For example, the call/message taker can highlight a portion of a second text message from citizen #3 (24) which is the location of the car accident 1324. Referring to FIG. 10, by way of right clicking on a mouse, or entering one or more keystroke combinations on a keyboard, an option menu 1000 appear where incident location 1010 is selected. The call/message taker associates the highlighted address, "Main St., Harvey, near E 148$^{th}$ Street," 1324 to a location field. Referring back to FIG. 6, the associated highlighted address, "Main St., Harvey, near E 148$^{th}$ Street," 1324 is inserted in the location field 622. The call/message taker can optionally select the hide button 850 to perform this task, or alternatively, not hide the window by moving the emergency incident form onto an available portion of one of the plurality of monitor displays. Alternatively, referring back to FIG. 6, the emergency incident report responds with a blinking query button 624 prompting the call/message taker to elicit more information pertaining to the incident location (not shown).

The call/message taker can next highlight a portion of a third text response from citizen #3 (24), which is the name of the citizen (i.e., Michael Douglas) 1326. Referring to FIG. 11, by way of right clicking on a mouse, or entering one or more keystroke combinations on a keyboard, an option menu 1100 appears in which information regarding the initial caller 1110 can be selected. Referring back to FIG. 6, the associated highlighted name is inserted in name field 640. The call/message taker can again optionally select the hide button 850 to perform this task, or alternatively, not hide the window by moving the emergency incident form onto an available portion of one of the plurality of monitor displays.

The call/message taker can next highlight a portion of a fifth text response from citizen #3 (24), which is information pertaining to the state of health of citizen #3 (24) (e.g., "my neck and my back are in pain") 1328. Referring to FIG. 9, by way of right clicking on a mouse, or entering one or more keystroke combinations on a keyboard, an option menu 900 appears where the comment field 924 is selected. Referring back to FIG. 6, the associated highlighted comments (i.e., "my neck and my back are in pain") is inserted in comment field 636. The call/message taker can optionally edit or add text to this comment, such as appending the words "Driver reports" to citizen #3's statement "my neck and my back are in pain" as well as delete the words "my."

Additional information related to the other driver, vehicle make, model and color of the vehicles involved in the car accident could be elicited. For example, the call/message taker could conclude that citizen #3 (24) is actually the other driver involved in the prior reported car accident discussed in the above text dialogue in FIG. 12. Accordingly, the call/message taker could avoid opening a second emergency incident report, or alternatively could close one of those reports and merge the content into one report. Moreover, the single or merged emergency incident report could be associated with the earlier reported house fire in that the car accident occurred directly in front of the house fire (e.g., perhaps one or both of the drivers were distracted looking at the fire).

Figure 14:
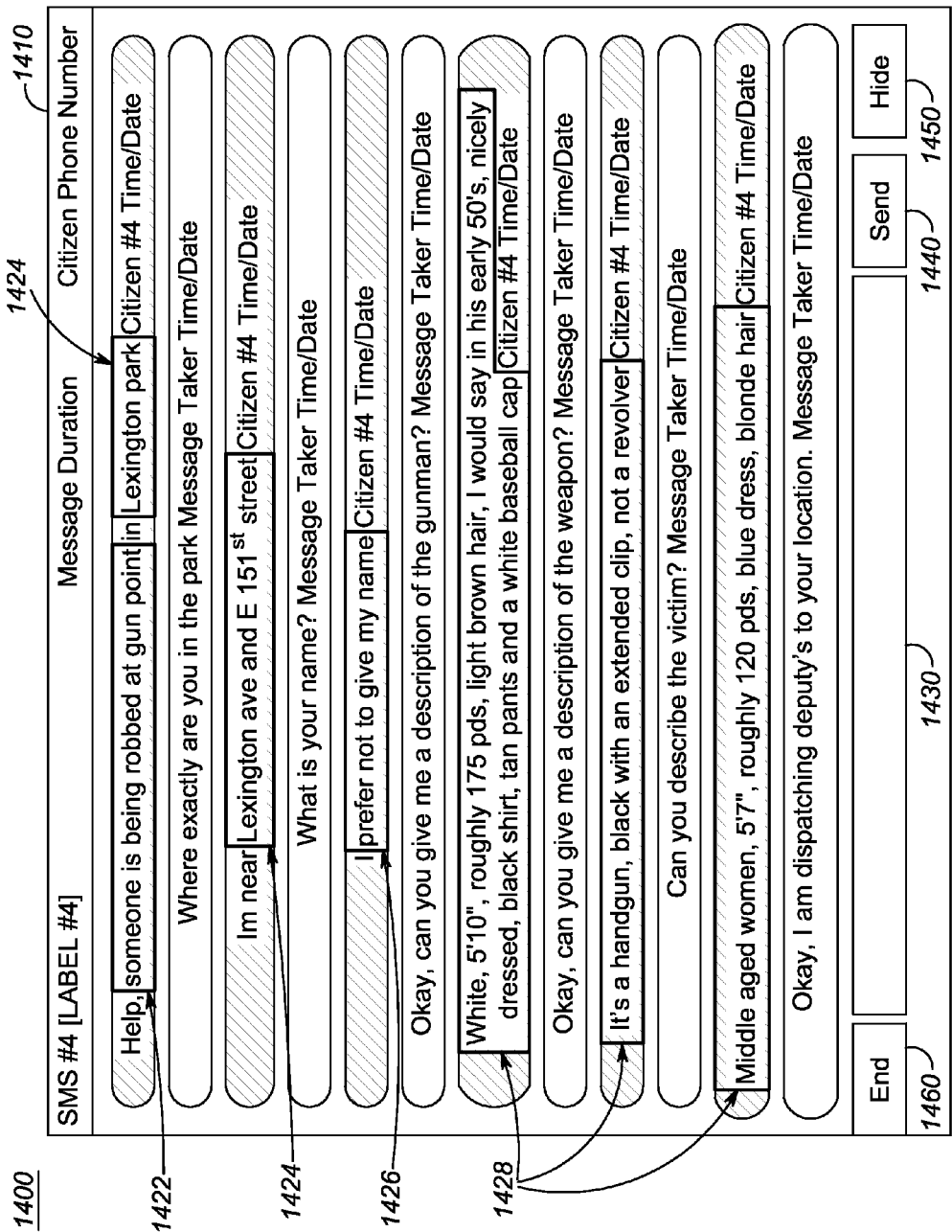
FIG. 14 is an illustration of an example of another native short message service dialogue between a citizen and a call/message taker regarding an armed robbery in accordance with example embodiments.

Referring now to FIG. 14, that drawing helps to illustrate and provide context to a single native SMS message dialogue received by a regional PSAP, such as incident number 3 (130) shown in FIG. 1. As shown in FIG. 14, a related native SMS message pop-up window 1400 to FIG. 7's fourth text message dialogue 740 is shown (i.e., by selecting fourth text message dialogue 740 by way of a HMI function or various short-cut key strokes). FIG. 14 contains a transcript of a message dialogue from a citizen reporting a car accident. For example, referring back to FIG. 1, the citizen could be citizen #4 (33) who is witnessing an armed robbery.

In one example embodiment, a call/message taker can interact with citizen #4 (33) by entering responses in white space 1430 and selecting the send button 1440, periodically selecting the hide button 1450 if required to perform another task, and, finally, selecting the end button 1460 after eliciting the necessary information. In one example embodiment, the call/message taker can highlight a portion of each segment of citizen #4's initial message or subsequent responses. That information can be readily inserted into a form-Tillable incident form, such as that shown in FIG. 6 and described above. The highlighted portion can be all, or less than all, of the initial message or subsequent responses. For example, in FIG. 14, citizen #4 (33) makes the initial statement "HELP, someone is being robbed at gunpoint in Lexington Park." In response, a call/message taker highlights part of that statement (i.e., "someone is being robbed at gunpoint") 1422. By way of right clicking on a mouse, or entering one or more keystroke combinations on a keyboard, an option menu 900 appears which provides several options. That is, the call/message taker can place the highlighted portion into memory by way of a copy comment 912 which saves "someone is being robbed at gunpoint" 1422 into one or more buffer memories. Alternatively, the call/message taker can set the highlighted portion as a label 914 suitable for quickly identifying the incident which can be saved in into a permanent memory, such as read only memory. The resulting designated label will appear at the top of the native SMS message pop-up window 1400 shown in FIG. 14 and in the fourth text message dialogue 740 in the related status text window 700 shown in FIG. 7.

The call/message taker can next proceed to do one of three tasks: (1) start an open emergency incident report (934), (2) associate additional portions of the initial or subsequent responses from citizen #2 (22) to an open emergency incident report (932), or (3) associate additional portions of the initial or subsequent responses from citizen #1 (10) to specific form-fillable fields in an emergency incident report 920.

For example, the call/message taker can highlight a portion of a second text message from citizen #4 (33), which is the location of the car accident 1424. Referring to FIG. 10, by way of right clicking on a mouse, or entering one or more keystroke combinations on a keyboard, an option menu 1000 appear where incident location 1010 is selected. The call/message taker associates the highlighted address, "Lexington Ave and E 151$^{st}$ street," to a location field 924. Referring back to FIG. 6, the associated highlighted address Lexington ave and E 151$^{st}$ street is inserted in location field 622. Alternatively, the call/message taker could highlight "Lexington Park" 1424 and select location field 924. The call/message taker can optionally select the hide button 850 to perform this task, or alternatively, not hide the window by moving the emergency incident form onto an available portion of one of the plurality of monitor displays.

The call/message taker can next highlight a portion of a third text response from citizen #4 (33), which is the name of the citizen which is "prefer not give my name" 1426. Referring to FIG. 11, by way of right clicking on a mouse, or entering one or more keystroke combinations on a keyboard, an option menu 1100 appears where the initial caller 1110 is selected. Referring back to FIG. 6, the associated highlighted name is inserted into the name field 640. The emergency incident report can respond to this typical message by indicating "caller refused to identify themself," or the like in the initial caller field. The call/message taker can, again, optionally select the hide button 850 to perform this task, or alternatively, not hide the window by moving the emergency incident form onto an available portion of one of the plurality of monitor displays.

The call/message taker can next highlight a portion of a fourth text response from citizen #4 (33), which is information pertaining to the description of the gunman, type of weapon and description of the victim 1428. Referring to FIG. 9, by way of right clicking on a mouse, or entering one or more keystroke combinations on a keyboard, an option menu 900 appears where the comment field 924 is selected. Referring back to FIG. 6, the associated highlighted comments (i.e., "White, 5'10", roughly 175 pds, light brown hair, I would say in his early 50's, nicely dressed, black shirt, tan pants and a white baseball cap", "handgun, black with extended clip, not a revolver", and "Middle aged women, 5'7", roughly 120 pds, blue dress, blonde hair") is inserted in comment field 636. The call/message taker can optionally edit or add text to this comment, such as prepending appending the words "Description of perpetrator/robber:" to "White, 5'10", roughly 175 pds, light brown hair, I would say in his early 50's, nicely dressed, black shirt, tan pants and a white baseball cap," and appending the words, description of victim:" to "Middle aged women, 5'7", roughly 120 pds, blue dress, blonde hair," as well as appending "weapon identification:" to handgun, black with extended clip, not a revolver."

Figure 15:
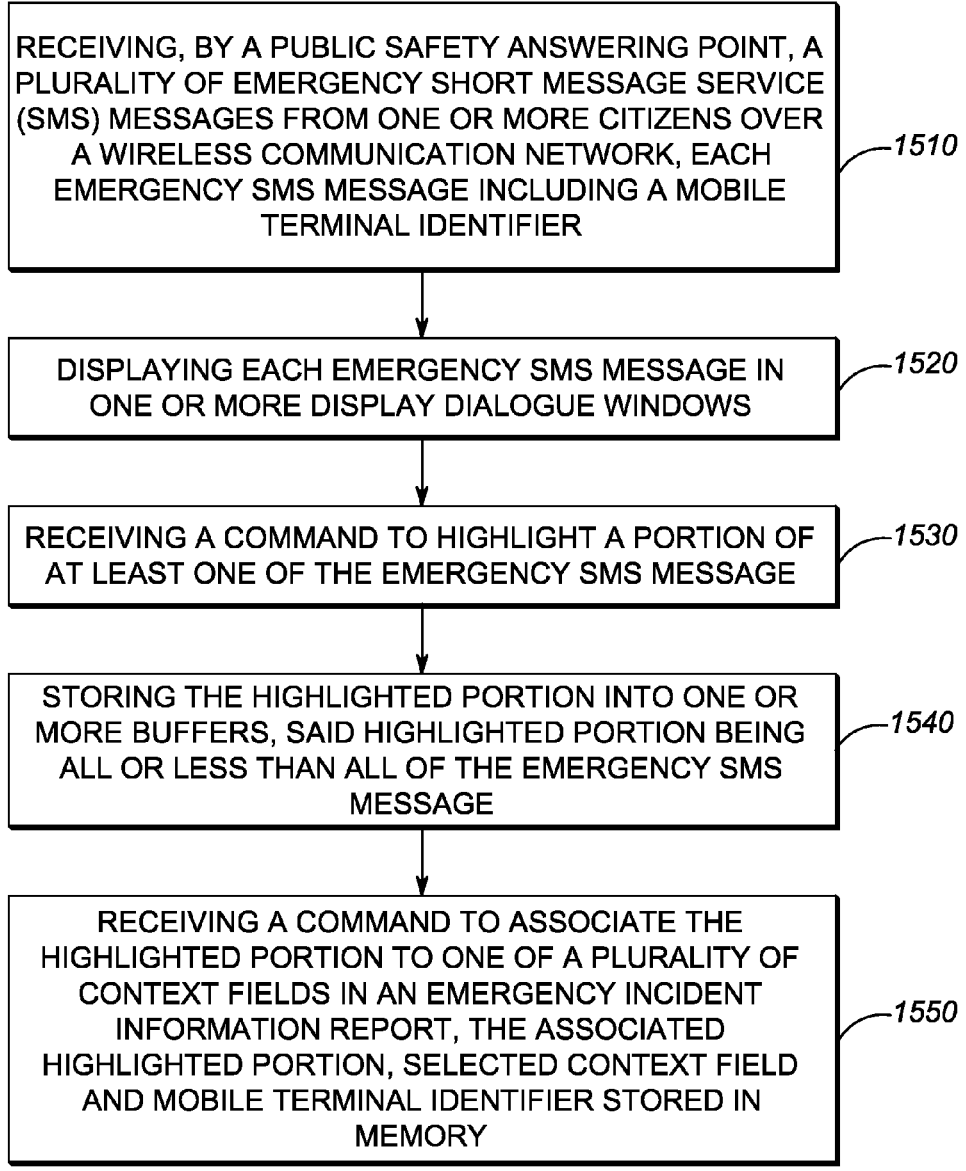
FIG. 15 is an example illustration of a method and/or computer program adapted to provide context-aware linkage between native short message service messages and a public safety incident in accordance with example embodiments.

Referring now to FIG. 15 an example illustration of a method and/or computer program adapted to provide context-aware linkage between native short message service messages and a public safety incident in accordance with example embodiments. As shown in FIG. 15, a computer aided dispatch method is shown comprising, receiving, by a public safety answering point, a plurality of emergency short message service (SMS) messages from one or more citizens over a wireless communication network, each emergency SMS message including a mobile terminal identifier (1510), displaying each emergency SMS message in one or more display dialogue windows (1520) receiving a command to highlight a portion of at least one of the emergency SMS message (1530) storing the highlighted portion into one or more buffers, said highlighted portion being all or less than all of the emergency SMS message (1540) and receiving a command to associate the highlighted portion to one of a plurality of context fields in an emergency incident information report, the associated highlighted portion, selected context field and mobile terminal identifier stored in memory (1550).

In one example embodiment, the highlighted portion of at least one of the emergency short service message is selected from the group consisting of a message body, a message phone number of a message originator or a message timestamp.

In another example embodiment, the method further comprises the step of opening the emergency incident information form in an active work area.

In yet another example embodiment, associating the highlighted portion to one of a plurality of context fields in an emergency incident information report is selected from the group consisting of selecting associate to an incident in an open dialogue window or selecting start incident in a new dialogue window.

In one example embodiment, an error message appears in response to selecting start incident if an incident information form is not opened in an active work area.

In one example embodiment, the context field is selected from a group consisting of incident location information, comments, information pertaining to a citizen originating the emergency SMS message, information pertaining to third party or initial caller.

In another example embodiment, the context field is a set as label field adapted to provide a title or other short identifier of the call nature.

In yet another example embodiment, the incident location is selected from a group consisting of a location city associated with the citizen or an apartment number or unit associated with the citizen.

In one example embodiment, the initial caller is selected from a group consisting of a first and last name of the citizen, a first name of the citizen, a last name of the citizen, a phone number of the citizen, a street address of the citizen, a city associated with of the citizen or an apartment number or unit associated with the of the citizen.

In another example embodiment if the emergency incident information form is not opened in an active work area further comprising the step of switching among one or more work areas so that a next work area containing an associated incident information form is active adapted to become populated by the caller taker.

In another example embodiment of public safety answering point is a legacy or transitional public safety answering point.

A further embodiment includes a computer aided dispatch method, comprising: receiving, by a public safety answering point, a plurality of emergency short message service (SMS) messages from one or more citizens over a wireless communication network, each emergency SMS message including a mobile terminal identifier; displaying each emergency SMS message in one or more display dialogue windows; receiving a command to associate the emergency SMS message to an incident information report; receiving a command to highlight a portion of at least one of the emergency SMS message; storing the highlighted portion into one or more buffers, said highlighted portion being all or less than all of the emergency SMS message; and receiving a command to send the highlighted portion to one of a plurality of context fields in the associated incident information report, the associated highlighted portion, selected context field and mobile terminal identifier stored in memory.

The method of some embodiments may include associating the emergency SMS message to an incident information report, and in further embodiments sending the highlighted portion to one of a plurality of context fields in the incident information report. Associating the SMS message may be performed by associating the message to the incident in the active work area; or by selecting a "start new incident" menu option.

The method may include sending the highlighted portion to one of a plurality of context fields in the associated incident information report. A specific incident information report need not be referenced for future transmissions of emergency SMS message content. The association has already been established and it's persistent.

In further embodiments, the 'start incident' action will open a new incident information report and establish the association. In alternative embodiments, if the emergency incident information form is not opened in an active work area, then the system may switch among one or more work areas so that a next work area containing an associated incident information form is active is adapted to become populated by the caller taker; or present an error message in response to the associated incident information report not being opened in one of the work areas.

In further embodiments, the program storage device, wherein if the emergency incident information form is not opened in an active work area further comprising the step of: switching among one or more work areas so that a next work area containing an associated incident information form is active adapted to become populated by the caller taker. The program storage device may include instructions such that the emergency incident information report is routed through a text control center to one or more legacy public safety answering points or one or more transitional public safety answering points.

A further embodiment may include a computer aided dispatch method, comprising: receiving from a text control center a plurality of emergency short message service (SMS) messages from one or more citizens over a wireless communication network, each emergency SMS message including a mobile terminal identifier; displaying each emergency SMS message in one or more display dialogue windows, in response to determining that at least of the emergency short message service (SMS) messages does not include location or identifying information pertaining to the originator of the message, receiving a command to highlight a portion of at least one of the emergency SMS message; storing the highlighted portion into one or more buffers, said highlighted portion being all or less than all of the emergency SMS message; and receiving a command to associate the highlighted portion to one of a plurality of context fields in an emergency incident information report, the associated highlighted portion, selected context field and mobile terminal identifier stored in memory. The method may be used where the public safety answering points is a legacy or transitional public safety answering point.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer aided dispatch method, comprising:
    receiving, by a public safety answering point, a plurality of emergency short message service (SMS) messages from one or more citizens over a wireless communication network, each emergency SMS message including a mobile terminal identifier;
    displaying each emergency SMS message in one or more display dialogue windows;
    receiving a command to highlight a portion of at least one of the emergency SMS message;
    storing the highlighted portion into one or more buffers, said highlighted portion being all or less than all of the emergency SMS message; and
    receiving a command to associate the highlighted portion to one of a plurality of context fields in an emergency incident information report, the associated highlighted portion, selected context field and mobile terminal identifier stored in memory.

2. The method of claim 1, wherein the highlighted portion of at least one of the emergency short service message is selected from the group consisting of:
    a message body;
    a message phone number of a message originator; or
    a message timestamp.

3. The method of claim 1, further comprising the step of:
    opening an emergency incident information form in an active work area.

4. The method of claim 1, wherein associating the highlighted portion to one of a plurality of context fields in an emergency incident information report is selected from the group consisting of:
    selecting associate to an incident in an open dialogue window; or
    selecting start incident in a new dialogue window.

5. The method of claim 4, wherein an error message appears in response to selecting start incident if an incident information form is not opened in an active work area.

6. The method of claim 1, wherein the context field is selected from a group consisting of:
   incident location information;
   comments;
   information pertaining to a citizen originating the emergency SMS message;
   information pertaining to third party or
   initial caller.

7. The method of claim 1, where the context field is a set as label field adapted to provide a title or other short identifier of the call nature.

8. The method of claim 6, wherein the incident location information is selected from a group consisting of:
   a location city associated with the citizen; or
   an apartment number or unit associated with the citizen.

9. The method of claim 6, wherein the initial caller is selected from a group consisting of:
   a first and last name of the citizen;
   a first name of the citizen;
   a last name of the citizen;
   a phone number of the citizen;
   a street address of the citizen;
   a city associated with of the citizen; or
   an apartment number or unit associated with the of the citizen.

10. The method of claim 5, wherein if the emergency incident information form is not opened in an active work area further comprising the step of:
   switching among one or more work areas so that a next work area containing an associated incident information form is active adapted to become populated by the caller taker.

11. The method of claim 1, wherein the public safety answering point is a legacy or transitional public safety answering point.

12. A program storage device readable by a machine, tangibly embodying a program of instructions executable by the machine for causing performance of operations, said operations comprising:
   receiving, by a public safety answering point, a plurality of emergency short message service (SMS) messages from one or more citizens over a wireless communication network, each emergency SMS message including a mobile terminal identifier;
   displaying each emergency SMS message in one or more display dialogue windows;
   receiving a command to highlight a portion of at least one of the emergency SMS message;
   storing the highlighted portion into one or more buffers, said highlighted portion being all or less than all of the emergency SMS message; and
   receiving a command to associate the highlighted portion to one of a plurality of context fields in an emergency incident information report, the associated highlighted portion, selected context field and mobile terminal identifier stored in memory.

13. The program storage device of claim 12, wherein the highlighted portion of at least one of the emergency short service message is selected from the group consisting of:
   a message body;
   a message phone number of a message originator; or
   a message timestamp.

14. The program storage device of claim 12, further comprising the step of:
   opening an emergency incident information form in an active work area.

15. The program storage device of claim 12, wherein associating the highlighted portion to one of a plurality of context fields in an emergency incident information report is selected from the group consisting of:
   selecting associate to an incident in an open dialogue window; or
   selecting start incident in a new dialogue window.

16. The program storage device of claim 15, wherein an error message appears in response to selecting start incident if an incident information form is not opened in an active work area.

17. The program storage device of claim 12, wherein the context field is selected from a group consisting of:
   incident location information;
   comments;
   information pertaining to a citizen originating the emergency SMS message;
   information pertaining to third party or
   initial caller.

18. The program storage device of claim 17, wherein the incident location information is selected from a group consisting of:
   a location city associated with the citizen; or
   an apartment number or unit associated with the citizen.

19. The program storage device of claim 12, where the context field is set as label field adapted to provide a title or other short identifier of the call nature.

20. The program storage device of claim 17, wherein the initial caller is selected from a group consisting of:
   a first and last name of the citizen;
   a first name of the citizen;
   a last name of the citizen;
   a phone number of the citizen;
   a street address of the citizen;
   a city associated with of the citizen; or
   an apartment number or unit associated with the of the citizen.

* * * * *

UNITED STATES PATENT AND TRADEMARK OFFICE
CERTIFICATE OF CORRECTION

| | |
|---|---|
| PATENT NO. | : 9,148,771 B2 |
| APPLICATION NO. | : 13/953051 |
| DATED | : September 29, 2015 |
| INVENTOR(S) | : Zentner et al. |

It is certified that error appears in the above-identified patent and that said Letters Patent is hereby corrected as shown below:

ON THE TITLE PAGE:

Item (71), delete "INC," and insert -- INC., --, therefor.

Item (72), under "Inventors," in Column 1, Line 1, delete "H" and insert -- H. --, therefor.

Item (72), under "Inventors," in Column 1, Line 2, delete "J" and insert -- J. --, therefor.

Item (72), under "Inventors," in Column 1, Line 3, delete "J" and insert -- J. --, therefor.

Item (72), under "Inventors," in Column 1, Line 4, delete "F" and insert -- F. --, therefor.

Item (72), under "Inventors," in Column 1, Line 5, delete "J" and insert -- J. --, therefor.

IN THE SPECIFICATION:

Column 3, Line 22, delete "device" and insert -- device. --, therefor.

Column 3, Line 32, delete "(UMTS)," and insert -- (UTRAN), --, therefor.

Column 3, Line 36, delete "callback" and insert -- fallback --, therefor.

Column 4, Line 65, delete "P SAP." and insert -- PSAP. --, therefor.

Column 4, Line 67, delete "determined" and insert -- determined. --, therefor.

Column 5, Line 26, delete "(IWF) function;" and insert -- function (IWF); --, therefor.

Column 5, Line 29, delete "(ESInet)" and insert -- (ESIPnet) --, therefor.

Signed and Sealed this
Seventh Day of June, 2016

Michelle K. Lee
*Director of the United States Patent and Trademark Office*

IN THE SPECIFICATION:

Column 5, Line 48, delete "MC 220" and insert -- MC 210 --, therefor.

Column 5, Line 49, delete "PSAP 240" and insert -- PSAP 260 --, therefor.

Column 5, Lines 66-67, delete "PSAP 250" and insert -- PSAP 260 --, therefor.

Column 6, Line 16, delete "an" and insert -- a mobile station --, therefor.

Column 6, Line 17, delete "(IMSI)," and insert -- (IMEI), --, therefor.

Column 6, Line 26, delete "(SLIP)" and insert -- (SLIS) --, therefor.

Column 7, Line 10, delete "(RS) 230" and insert -- (SR) 250 --, therefor.

Column 7, Line 23, delete "SR 230" and insert -- SR 250 --, therefor.

Column 7, Lines 27-28, delete "SR 230." and insert -- SR 250. --, therefor.

Column 7, Line 30, delete "PSAP 240 via the SR 230." and insert -- PSAP 260 via the SR 250. --, therefor.

Column 7, Line 32, delete "SR 2 30." and insert -- SR 250. --, therefor.

Column 7, Line 34, delete "interface 220" and insert -- interface --, therefor.

Columns 8 & 9, Lines 67 & 1, delete "(P SAP)" and insert -- (PSAP) --, therefor.

Column 9, Line 60, delete "an" and insert -- a mobile station --, therefor.

Column 9, Line 62, delete "(IMSI)," and insert -- (IMEI), --, therefor.

Column 10, Line 65, delete "(esIPnet)." and insert -- (esIPnet). --, therefor.

Column 11, Line 61, delete "Tillable" and insert -- fillable --, therefor.

Column 12, Lines 10-11, delete "Tillable" and insert -- fillable --, therefor.

Column 12, Line 29, delete "Tillable" and insert -- fillable --, therefor.

Column 12, Line 56, delete "Tillable" and insert -- fillable --, therefor.

Column 13, Line 4, delete "P SAP)." and insert -- PSAP). --, therefor.

CERTIFICATE OF CORRECTION (continued)
U.S. Pat. No. 9,148,771 B2

IN THE SPECIFICATION:

Column 14, Line 63, delete "Tillable" and insert -- fillable --, therefor.

Column 16, Line 14, delete "Tillable" and insert -- fillable --, therefor.

Column 17, Line 49, delete "Tillable" and insert -- fillable --, therefor.

Column 19, Line 51, delete "the of the" and insert -- the --, therefor.

IN THE CLAIMS:

Claim 6, Column 23, Line 7, delete "party" and insert -- party; --, therefor.

Claim 9, Column 23, Line 24, delete "the of the" and insert -- the --, therefor.

Claim 17, Column 24, Line 32, delete "party" and insert -- party; --, therefor.

Claim 20, Column 24, Line 51, delete "the of the" and insert -- the --, therefor.